(12) United States Patent
Ohguchi et al.

(10) Patent No.: US 10,608,492 B2
(45) Date of Patent: Mar. 31, 2020

(54) STATOR AND ROTATING ELECTRICAL MACHINE INCLUDING THE SAME

(71) Applicant: FUJI ELECTRIC CO., LTD., Kawasaki (JP)

(72) Inventors: Hideki Ohguchi, Hino (JP); Hitoshi Nakazono, Suzuka (JP); Hideki Nishikawa, Kameyama (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 307 days.

(21) Appl. No.: 15/637,972

(22) Filed: Jun. 29, 2017

(65) Prior Publication Data

US 2018/0048203 A1 Feb. 15, 2018

(30) Foreign Application Priority Data

Aug. 10, 2016 (JP) ................. 2016-157897

(51) Int. Cl.
*H02K 3/04* (2006.01)
*H02K 3/12* (2006.01)
*H02K 15/04* (2006.01)
*H02K 3/34* (2006.01)
*H02K 3/52* (2006.01)

(52) U.S. Cl.
CPC ............ *H02K 3/12* (2013.01); *H02K 3/04* (2013.01); *H02K 3/345* (2013.01); *H02K 3/524* (2013.01); *H02K 15/0421* (2013.01)

(58) Field of Classification Search
CPC ................................... H02K 3/04–12
USPC .......................................... 310/208
See application file for complete search history.

(56) References Cited

U.S. PATENT DOCUMENTS

| | | | | |
|---|---|---|---|---|
| 6,441,527 | B1* | 8/2002 | Taji | H02K 3/12 310/201 |
| 6,476,530 | B1* | 11/2002 | Nakamura | H02K 3/12 310/201 |
| 6,770,999 | B2* | 8/2004 | Sakurai | H02K 3/12 310/201 |
| 8,008,830 | B2 | 8/2011 | Kouda et al. | |
| 8,253,296 | B2 | 8/2012 | Kouda et al. | |
| 2010/0141078 | A1 | 6/2010 | Kouda et al. | |

(Continued)

FOREIGN PATENT DOCUMENTS

| JP | 2003-18778 | 1/2003 |
|---|---|---|
| JP | 2009-112186 | 5/2009 |

*Primary Examiner* — Alexander Talpalatski

(57) ABSTRACT

A stator reducing a coil end height without interference between conductor segments and without damage to an insulating coating. Each conductor segment includes linear parts inserted in slots formed in a stator core and different in circumferential direction, inclined parts inclined and extending from respective end parts of the linear parts toward a center part so as to project toward the outside in an axis direction from an axis-direction end surface of the core, and a projecting curve part connecting apical ends of the inclined parts to each other and curves and projects toward the outside in the axis direction. Connection parts between the linear parts and the inclined parts and a curved part of the projecting curve part are all bent parts having the same bend radius of minimum R, which has a size equal to or more than a sheet width of a conductor strand.

8 Claims, 31 Drawing Sheets

(56) References Cited

U.S. PATENT DOCUMENTS

2012/0007462 A1 1/2012 Kouda et al.
2014/0111055 A1* 4/2014 Chamberlin ............ H02K 3/12
310/208

* cited by examiner

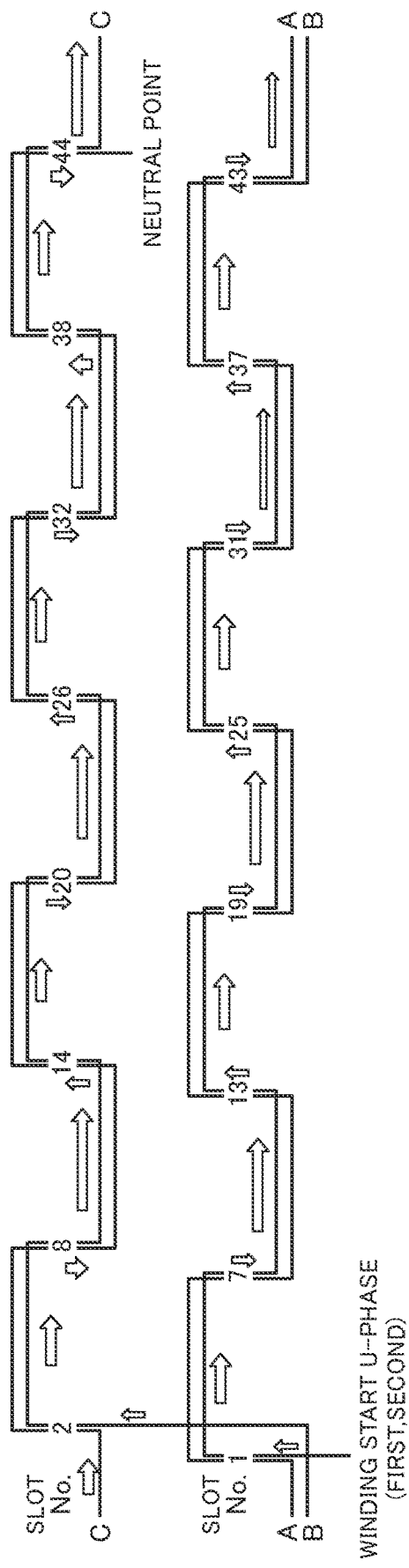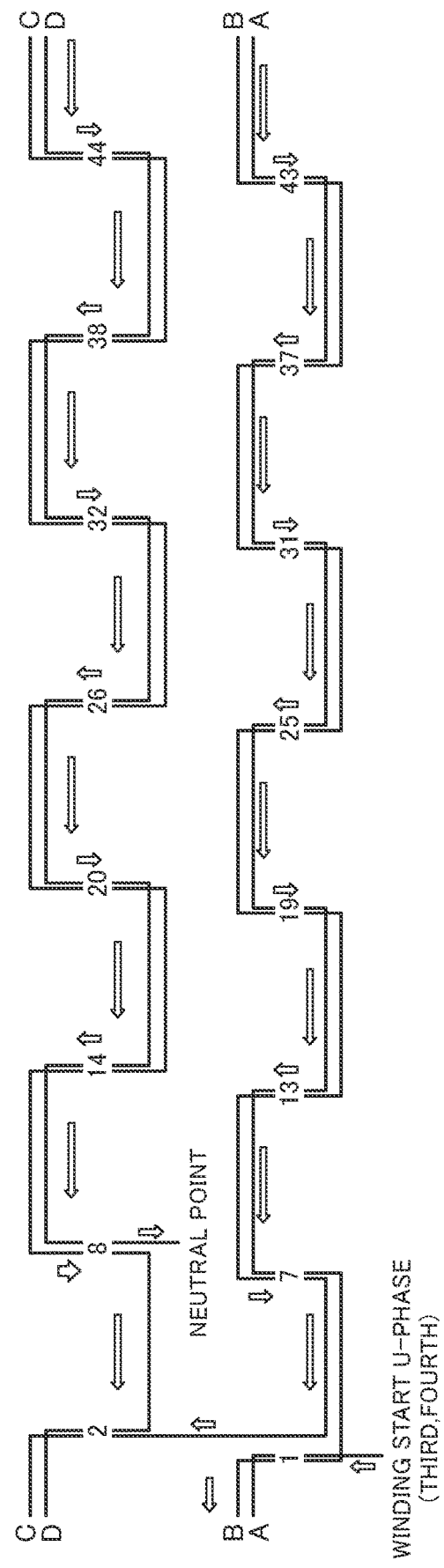

STATOR AND ROTATING ELECTRICAL MACHINE INCLUDING THE SAME

CROSS-REFERENCE TO RELATED APPLICATIONS

This application claims benefit of foreign priority under 35 USC 119 based on Japanese Patent Application No. 2016-157897 filed on Aug. 10, 2016, the entire contents of which are incorporated by reference herein.

TECHNICAL FIELD

The present invention relates to a stator having a plurality of stator windings each of which is configured by bonding end parts of a plurality of conductor segments each of which is obtained by forming a conductor strand into a substantially U shape, and a rotating electrical machine including the stator.

BACKGROUND ART

As a conventional motor of this kind, for example, one illustrated in PTL 1 is known.

Each of conductor segments in the motor illustrated in PTL 1 is obtained by forming a substantially rectangular-shaped conductor strand having a flat cross section into a substantially U shape, and a crank-shaped part without torsion is formed in the center part thereof. A conductor segment is inserted in slots formed in a stator core and is bent such that both end parts thereof are close to each other and the conductor segment makes a circle, and an end part is bonded to an end part of another adjacent conductor segment to form distribution winding by one conductor strand when electrically viewed, so that a stator winding is configured. The crank-shaped part of the conductor segment is formed to be overlapped with an adjacent conductor segment, more specifically, to be displaced by a width of the strand, and to have a length within a range of a distance between adjacent slots.

In this manner, the crank-shaped part of the conductor segment is formed to be displaced by the width of the strand, and not to generate torsion, so that the accuracy of overlap with an adjacent conductor segment can be increased, and therefore, a bulge of a stator in the radial direction in a coil end part of the stator winding, in which the crank-shaped part and the bonding part of the end parts are placed, can be suppressed.

In addition, as a stator having a stator winding configured by bonding end parts of a plurality of conductor segments, and a rotating electrical machine using the stator, for example, ones illustrated in PTL 2 are known.

A wire rod (conductor segment) for forming the stator winding in the rotating electrical machine illustrated in PTL 2 includes a pair of slot-housed parts to be placed in slots formed in a stator core and different in the circumferential direction, and turn parts that project toward the outside in the axis direction of the stator core from the slots and connect the pair of slot-housed parts to each other. A crank part without torsion is formed in the substantially center part of the turn parts. At projecting places of the turn parts that project toward the outside in the axis direction of the stator core from the slots, a pair of step parts that extends in parallel to an axis-direction end surface of the stator core from the respective pair of slot-housed parts is formed, and two step parts that extend in parallel to the axis-direction end surface of the stator core are formed between the crank part in the substantially center part and each of the pair of step parts.

In this manner, at the projecting places of the turn parts that project toward the outside in the axis direction of the stator core from the slots, the pair of step parts that extends in parallel to the axis-direction end surface of the stator core from the respective pair of slot-housed parts is formed, and thus, a distance between the projecting places of the turn parts is narrower than a distance between the slots in which the wire rod is placed. Accordingly, the shape of the wire rod that projects from the stator core becomes small, and a coil end height (a projecting height of the wire rod from the axis-direction end surface of the stator core) can be reduced.

In addition, the turn parts are formed in a staircase pattern having a plurality of step parts that extends in parallel to the axis-direction end surface of the stator core, and thus, the coil end height can be more suppressed by the plurality of step parts.

CITATION LIST

Patent Literature

PTL 1: JP 2003-18778 A
PTL 2: JP 2009-112186 A

SUMMARY OF INVENTION

Technical Problem

However, the conventional motor illustrated in PTL 1 and rotating electrical machine illustrated in PTL 2 have the following problems.

More specifically, in the case of the motor illustrated in PTL 1, each of the conductor segments includes a pair of linear parts to be inserted in the slots formed in the stator core and different in the circumferential direction, a pair of inclined parts that is inclined and extends from respective end parts of the pair of linear parts toward the center part so as to project from an axis-direction end surface of the stator core, a curve part that connects apical ends of the pair of inclined parts to each other, and the crank-shaped part formed in the curve part. Each of the conductor segments is formed by bending of a wire rod, and thus, bending with R is performed for between the linear parts and the inclined parts and the crank-shaped part between the apical ends of the pair of inclined parts.

Here, in PTL 1, the size of bent parts with R in each of the conductor segments is not particularly defined, and thus, adjacent conductor segments may interfere with each other depending on the size. In addition, insulating coating in the conductor segments may be damaged depending on the size of the bent parts of R. Furthermore, when changing the dimension of each of the conductor segments so as to avoid the interference between adjacent conductor segments, a coil end height may become high.

On the other hand, in the case of the rotating electrical machine illustrated in PTL 2, although the coil end height can be reduced and interference between adjacent wire rods can be avoided, bending needs to be performed such that the plurality of step parts extends in parallel to the axis-direction end surface of the stator core in a staircase pattern, and thus, the manufacture is difficult.

Therefore, the present invention was made to solve the conventional problems, and an object thereof is to provide a stator that can be manufactured by a simple manufacturing method while reducing a coil end height without interference between adjacent conductor segments and without damage of insulating coating, and a rotating electrical machine using the stator.

Solution to Problem

In order to achieve the above-described object, a stator according to one mode of the present invention includes a stator core having a plurality of slots in a circumferential direction; and a plurality of stator windings placed in the plurality of slots, each of the plurality of stator windings is configured by bonding end parts of a plurality of conductor segments each of which is obtained by forming a conductor strand having a substantially rectangular cross section into a substantially U shape, in which each of the plurality of conductor segments includes a pair of linear parts to be inserted in a pair of slots formed in the stator core and different in the circumferential direction, a pair of inclined parts that is inclined and extends from end parts on an opposite side of the respective end parts of the pair of linear parts in an axis direction toward a center part so as to project toward the outside in the axis direction from an axis-direction end surface of the stator core, a projecting curve part that connects apical ends of the pair of inclined parts to each other and curves and projects toward the outside in the axis direction, and a crank-shaped part provided in the projecting curve part, and at least connection parts between the respective pair of linear parts and the respective pair of inclined parts and a curved part of the projecting curve part are all bent parts having the same bend radius of the minimum R, which has a size equal to or more than a sheet width of the conductor strand.

In addition, a rotating electrical machine according to another mode of the present invention includes the above-described stator; and a rotor provided on an inner peripheral side of the stator core of the stator.

Advantageous Effects of Invention

According to the stator and the rotating electrical machine according to the present invention, a stator that can be manufactured by a simple manufacturing method while reducing a coil end height without interference between adjacent conductor segments and without damage of insulating coating, and a rotating electrical machine using the stator can be provided.

BRIEF DESCRIPTION OF DRAWINGS

FIG. 8A is a diagram for describing the wire connection method of two U-phase stator windings, and FIG. 8B is a diagram for describing the wire connection method of the other two U-phase stator windings;

DESCRIPTION OF EMBODIMENTS

Hereinafter, an embodiment of the present invention will be described with reference to the drawings.

Figure 1:
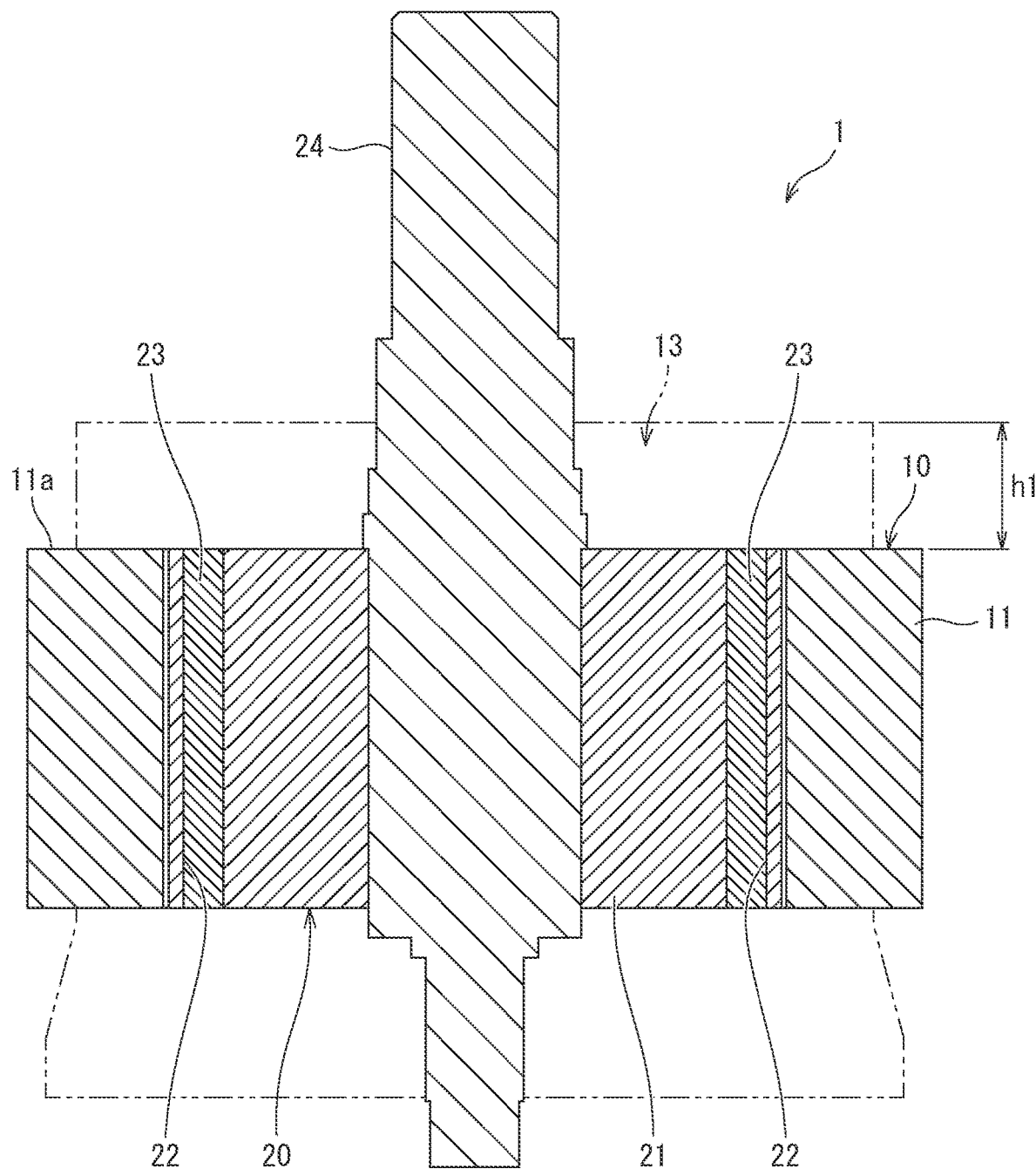
FIG. 1 is a cross-sectional view of a rotating electrical machine according to one embodiment of the present invention.

A rotating electrical machine illustrated in one embodiment of the present invention is illustrated in FIG. 1, and the rotating electrical machine 1 is a three-phase permanent magnet synchronous motor, and includes a stator 10 and a rotor 20 rotatably arranged with a predetermined air gap provided on the inner peripheral side of a stator core 11 of the stator 10.

The rotor 20 includes a rotor core 21 fixed to a rotation axis 24 and obtained by laminating a plurality of magnetic steel sheets in the axis direction, a plurality of rotor slots 22 penetrating in the axis direction and disposed in the circumferential direction of the rotor core 21, and a plurality of permanent magnets 23 placed in the respective rotor slots 22.

In addition, as illustrated in FIG. 1 to FIG. 6, the stator 10 includes the stator core 11 and a plurality of stator windings 13.

Figure 2:
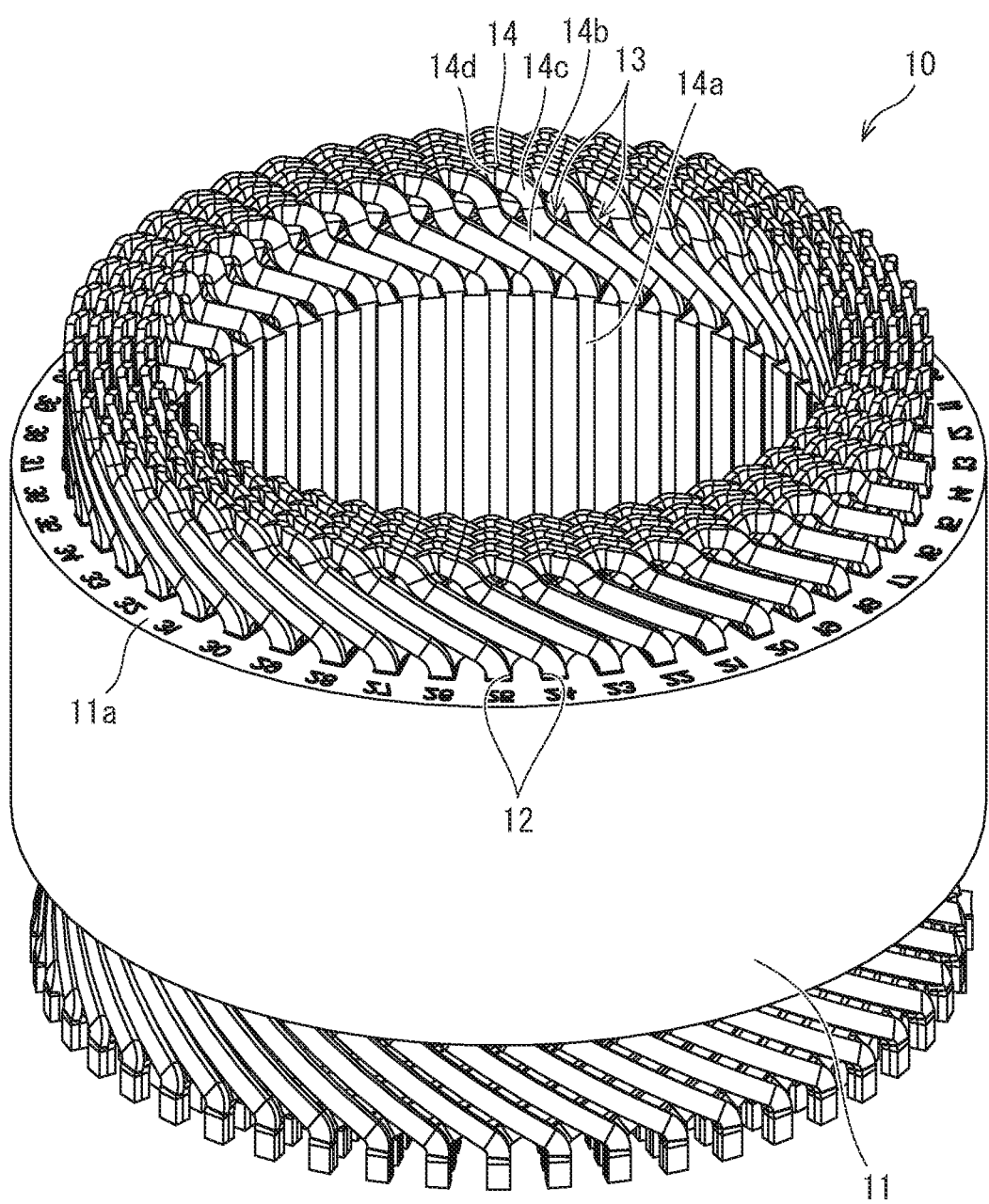
FIG. 2 is a perspective view of a stator used in the rotating electrical machine illustrated in FIG. 1, as viewed from obliquely above.
Figure 3:
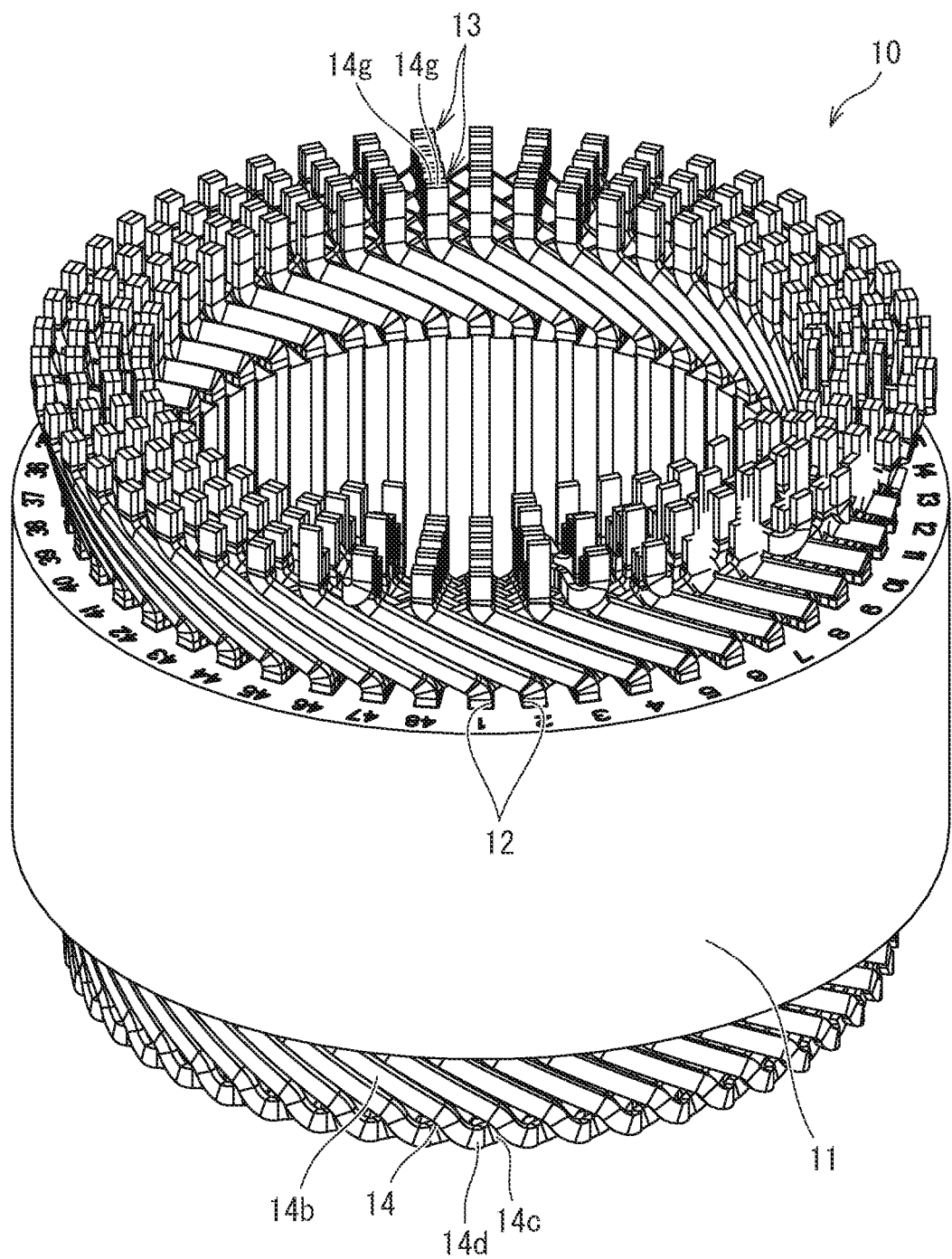
FIG. 3 is a perspective view of the stator illustrated in FIG. 2, as viewed from obliquely below.
Figure 4:
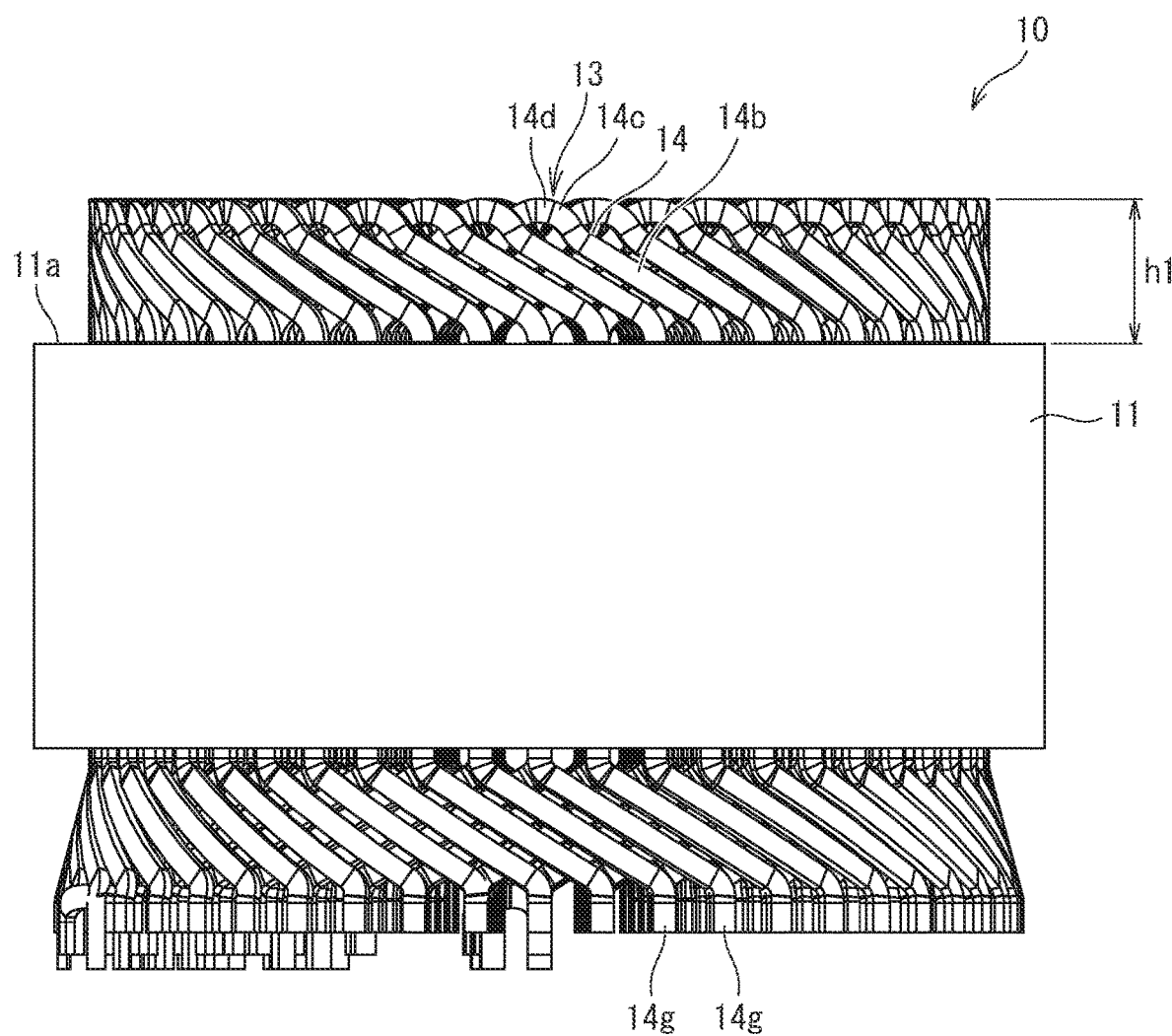
FIG. 4 is a front view of the stator illustrated in FIG. 2.
Figure 5:
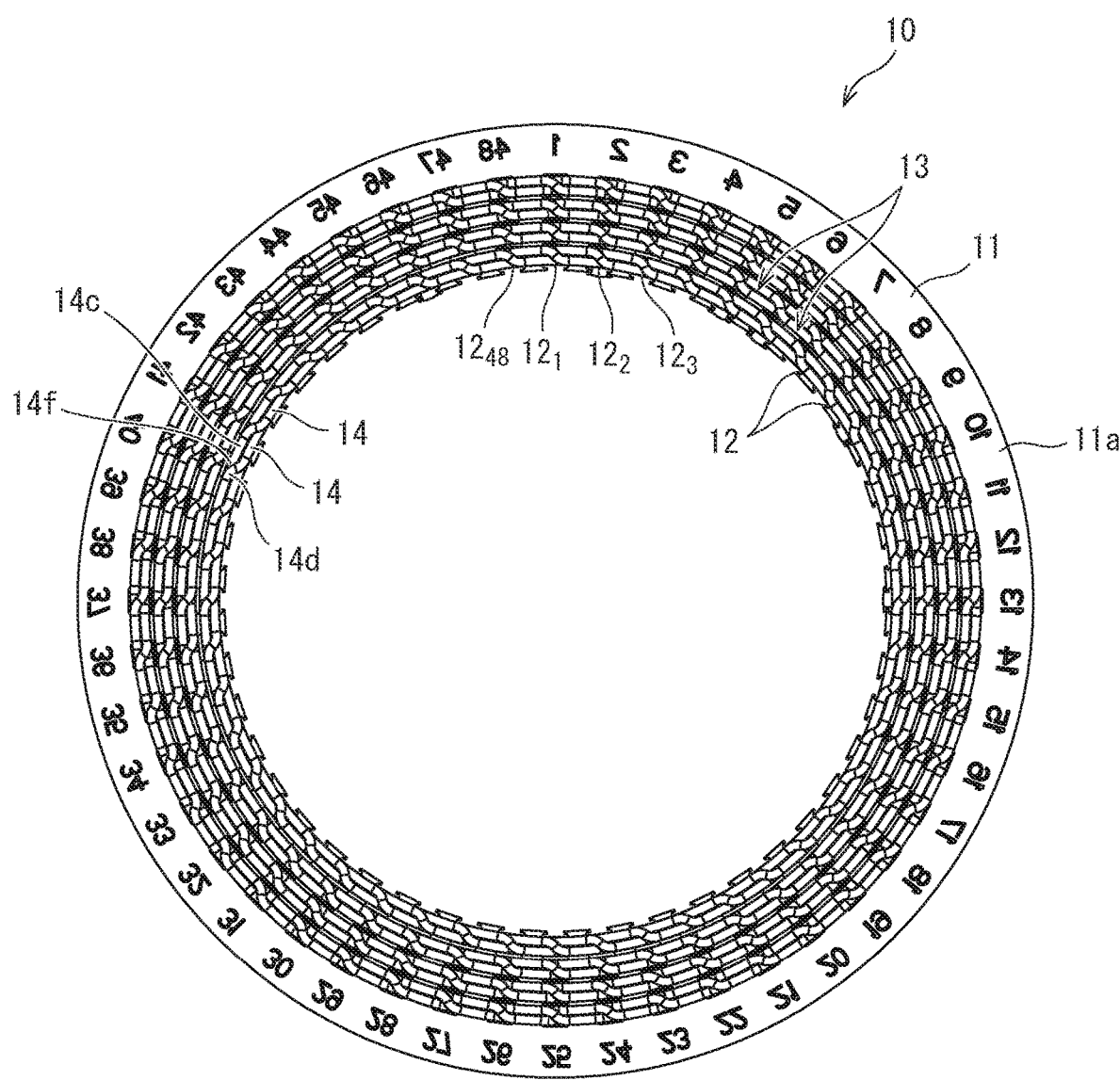
FIG. 5 is a plan view of the stator illustrated in FIG. 2.
Figure 6:
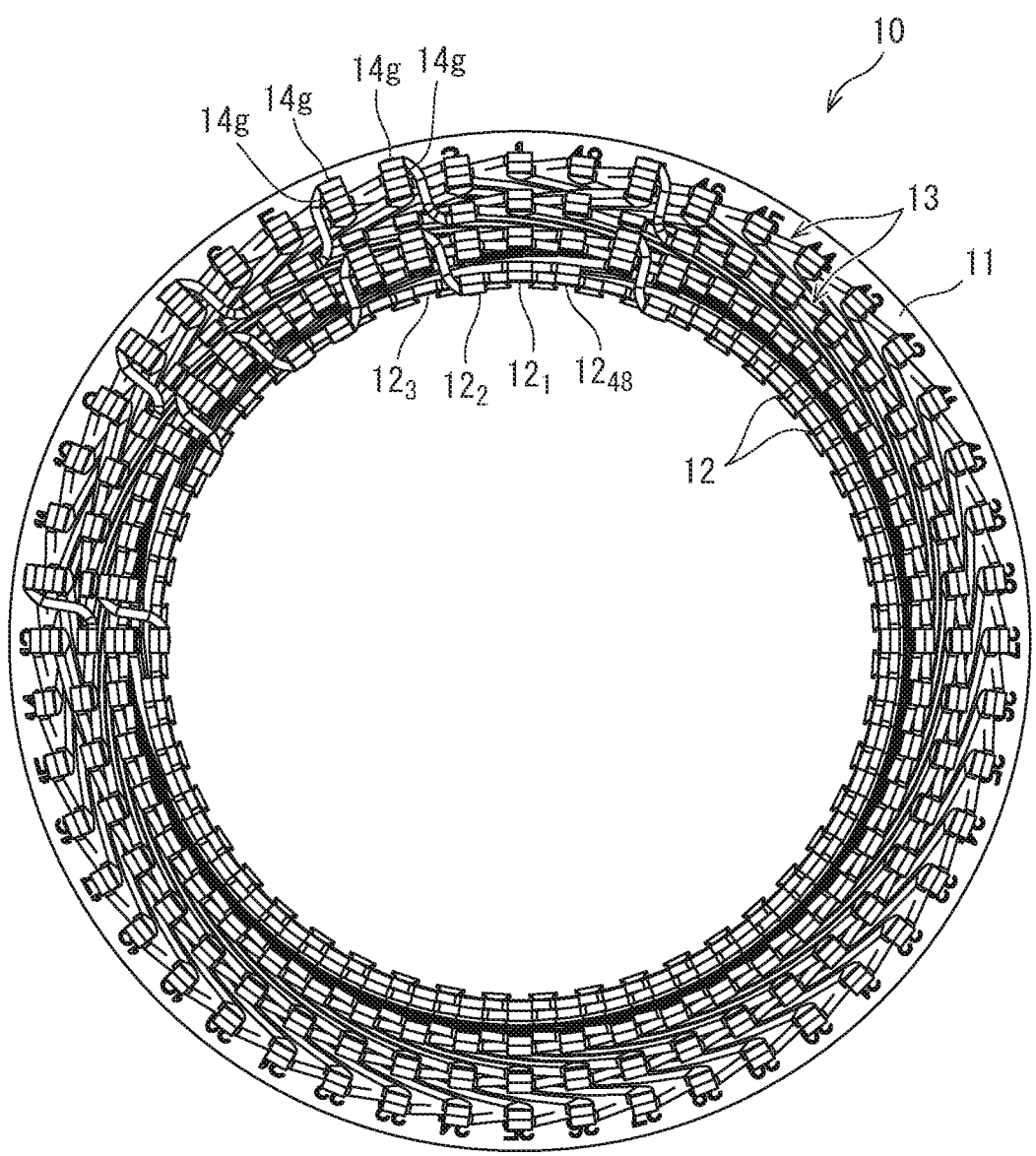
FIG. 6 is a bottom view of the stator illustrated in FIG. 2.

Here, as illustrated in FIG. 2, the stator core 11 is formed into a hollow cylinder shape obtained by laminating a plurality of magnetic steel sheets in the axis direction, and a plurality of slots 12 is formed in the circumferential direction. Each of the slots 12 opens on the inner peripheral surface of the stator core 11, and is formed to be long and thin toward the outside in the radial direction of the stator core 11. The number of the slots 12 is 48 in the present embodiment. Hereinafter, as illustrated in FIG. 5 (only reference numerals $12_1$ to $12_3$, and $12_{48}$ of first to third, and 48th slots are illustrated in FIG. 5), the description is provided on the assumption that a first slot of slot No. 1 has a reference numeral $12_1$, a second slot of slot No. 2 has a reference numeral $12_2$, . . . an N-th slot of slot No. N has a reference numeral $12_N$, . . . and a 48th slot of slot No. 48 has a reference numeral $12_{48}$.

The stator windings 13 are three-phase windings, and a total of 12 stator windings 13, which includes four U-phase stator windings 13, four V-phase stator windings 13, and four W-phase stator windings 13, are placed in the 48 slots 12. The four U-phase stator windings 13 are connected in parallel, the four V-phase stator windings 13 are connected in parallel, and moreover, the four W-phase stator windings 13 are also connected in parallel.

The respective four U-phase stator windings 13 are placed in the first slot $12_1$ and the second slot $12_2$, the seventh slot $12_7$ and the eighth slot $12_8$, the 13th slot $12_{13}$ and the 14th slot $12_{14}$, the 19th slot $12_{19}$ and the 20th slot $12_{20}$, the 25th slot $12_{25}$ and the 26th slot $12_{26}$, the 31st slot $12_{31}$ and the 32nd slot $12_{32}$, the 37th slot $12_{37}$ and the 38th slot $12_{38}$, and the 43rd slot $12_{43}$ and the 44th slot $12_{44}$, each of which are adjacent in the circumferential direction.

In addition, the respective four V-phase stator windings 13 are placed in the third slot $12_3$ and the fourth slot $12_4$, the ninth slot $12_9$ and the 10th slot $12_{10}$, the 15th slot $12_{15}$ and the 16th slot $12_{16}$, the 21st slot $12_{21}$ and the 22nd slot $12_{22}$, the 27th slot $12_{27}$ and the 28th slot $12_{28}$, the 33rd slot $12_{33}$ and the 34th slot $12_{34}$, the 39th slot $12_{39}$ and the 40th slot $12_{40}$, and the 45th slot $12_{45}$ and the 46th slot $12_{46}$, each of which are adjacent in the circumferential direction.

Furthermore, the respective four W-phase stator windings 13 are placed in the fifth slot $12_5$ and the sixth slot $12_6$, the 11th slot $12_{11}$ and the 12th slot $12_{12}$, the 17th slot $12_{17}$ and the 18th slot $12_{18}$, the 23rd slot $12_{23}$ and the 24th slot $12_{24}$, the 29th slot $12_{29}$ and the 30th slot $12_{30}$, the 35th slot $12_{35}$ and the 36th slot $12_{36}$, the 41st slot $12_{41}$ and the 42nd slot $12_{42}$, and the 47th slot $12_{47}$ and the 48th slot $12_{48}$, each of which are adjacent in the circumferential direction.

Figure 7A:
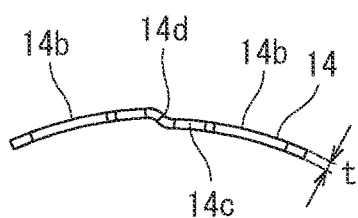
FIG. 7A is a plan view.
Figure 7C:
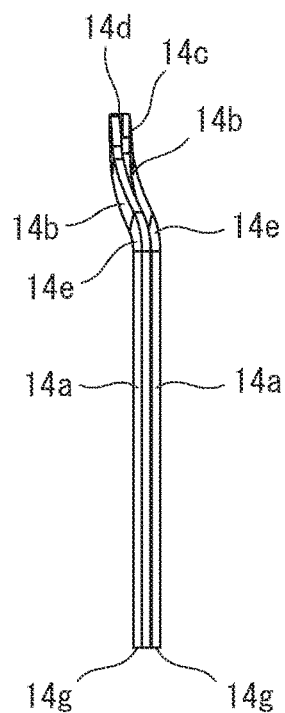
FIG. 7C is a left side view.
Figure 7B:
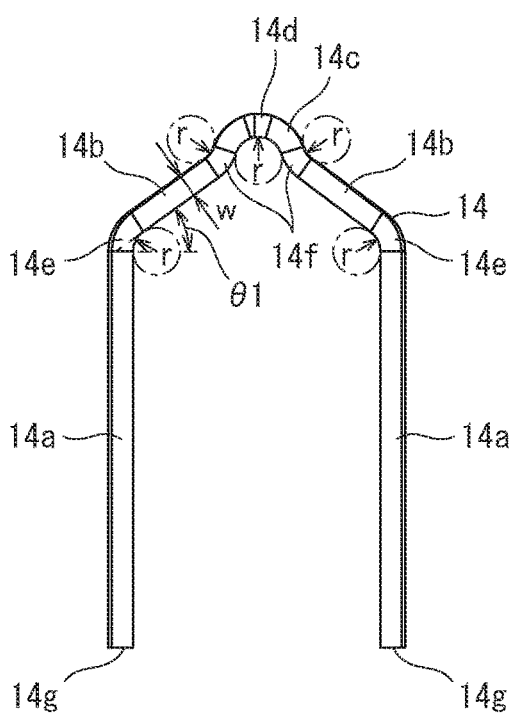
FIG. 7B is a front view.
Figure 7D:
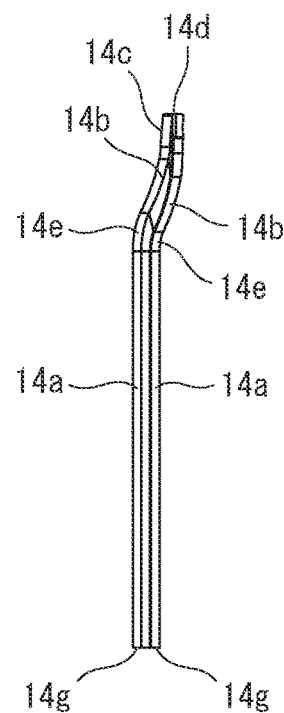
FIG. 7D is a right side view of a conductor segment used in the stator illustrated in FIG. 2.

As illustrated in FIG. 7A and FIG. 7B, each of the stator windings 13 is configured by bonding end parts 14g of a plurality of conductor segments 14 each of which is obtained by forming a conductor strand having a sheet width of W, a sheet thickness of t, and a substantially rectangular cross section into a substantially U shape. The wire connection method of the U-phase stator windings 13 will be described in detail below.

Here, as illustrated in FIG. 7A, FIG. 7B, FIG. 7C, and FIG. 7D, each of the conductor segments 14 includes a pair of linear parts 14a, a pair of inclined parts 14b, a projecting curve part 14c, and a crank-shaped part 14d. Each of the conductor segments 14 is formed by performing enamel coating (insulating coating) on the outer periphery of the conductor strand having a substantially rectangular cross section and performing bending described below.

Figure 9:
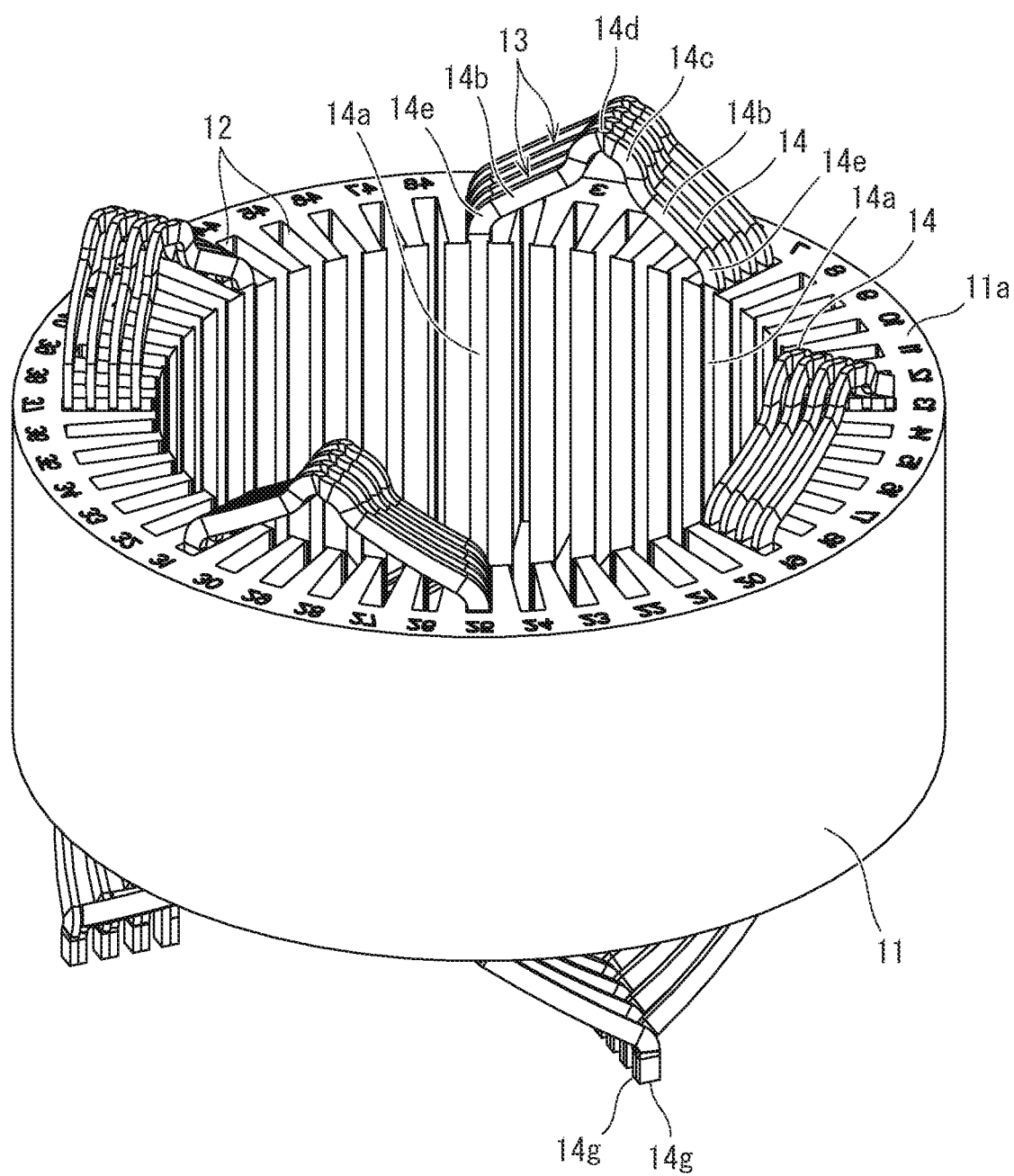
FIG. 9 is a perspective view of the stator in the state during the wire connection of the two U-phase stator windings, as viewed from obliquely above.
Figure 10:
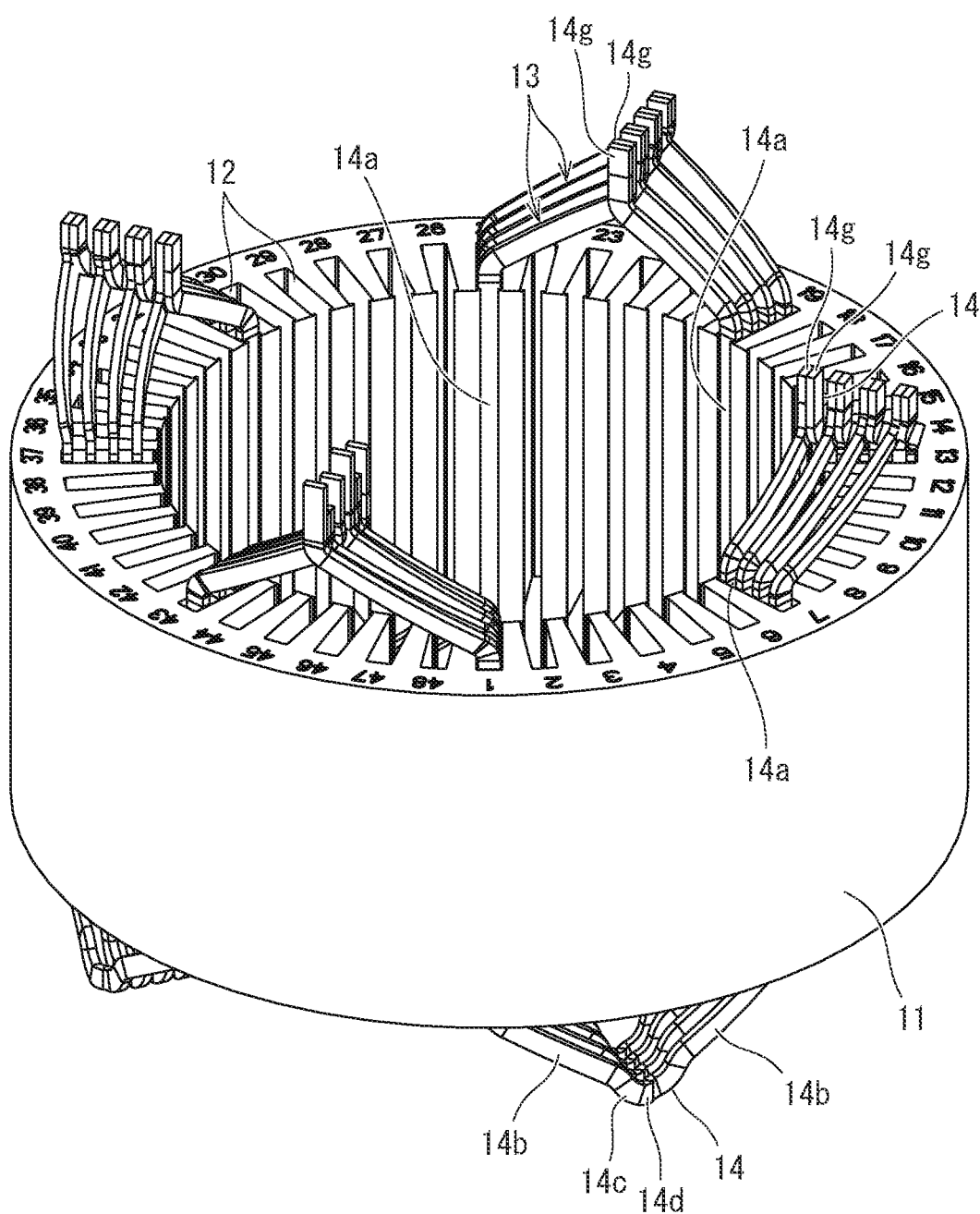
FIG. 10 is a perspective view of the stator in the state during the wire connection of the two U-phase stator windings illustrated in FIG. 9, as viewed from obliquely below.

As illustrated in FIG. 9, the pair of linear parts 14a of each of the conductor segments 14 is inserted in a pair of slots 12 formed in the stator core 11 and different in the circumferential direction (in one example, the first slot $12_1$ and the seventh slot $12_7$), and the end part (lower end part in FIG. 9 and upper end part in FIG. 10) 14g of each of the linear parts 14a is bent in the circumferential direction, and is bonded by welding to the end part 14g of another conductor segment 14 bent in the circumferential direction in the same manner. In FIG. 10, in terms of a part of one U-phase stator winding 13, the pair of linear parts 14a of a conductor segment 14 is inserted in the first slot $12_1$ and the seventh slot $12_7$, and the linear part 14a inserted in the first slot $12_1$ is bent in the circumferential direction toward the 43rd slot $12_{43}$, and is bonded to the end part 14g of another conductor segment 14 whose linear part 14a is inserted in the 43rd slot $12_{43}$. On the other hand, the linear part 14a inserted in the seventh slot $12_7$ is bent in the circumferential direction toward the 13th slot $12_{13}$, and is bonded to the end part 14g of another conductor segment 14 whose linear part 14a is inserted in the 13th slot $12_{13}$.

In addition, as illustrated in FIG. 7 and FIG. 9, the pair of inclined parts 14b is inclined and extends from end parts on the opposite side of the respective end parts 14g of the pair of linear parts 14a in the axis direction toward the center part so as to project toward the outside in the axis direction (upper side in FIG. 9) from an axis-direction end surface 11a of the stator core 11. As illustrated in FIG. 16B, an inclination angle θ1 of each of the inclined parts 14b with respect to the horizon (refer to FIG. 7B) is determined by a projection height h1 of the conductor segment 14 from the axis-direction end surface 11a of the stator core 11. In the case of the present embodiment, since the projecting curve part 14c is provided in the conductor segment 14, the inclination angle θ1 is smaller than an inclination angle θ3 in the case of using the conductor segments 14 illustrated in FIG. 20B.

In addition, the projecting curve part 14c is formed to connect apical ends of the pair of inclined parts 12b to each other and to curve and project toward the outside in the axis direction. The projecting curve part 14c is configured by only a part that curves toward the outside in the axis direction from the apical ends of the respective inclined parts 14b.

Furthermore, the crank-shaped part 14d is formed in the projecting curve part 14c, and displaces the conductor segment 14 by the sheet thickness t of the conductor segment 14 from one inclined part 14b toward the other inclined part 14b, as illustrated in FIG. 7A.

In each of the conductor segments 14, as illustrated in FIG. 7B, connection parts 14e between the respective pair of linear parts 14a and the respective pair of inclined parts 14b, a curved part of the projecting curve part 14c, and connection parts 14f between the apical ends of the respective pair of inclined parts 14b and the projecting curve part 14c are all bent parts having the same bend radius r of the minimum R. Here, the minimum R means equal to or more than the sheet width w of the conductor segment 14 (conductor strand), and equal to or less than the bend radius r by which the inclination angle θ1 of the inclined part 14b determined by the bend radius r is approximately 30° or more when the projection height h1 of the conductor segment 14 and a distance between the two linear parts 14a are fixed.

This is because the bend radius that does not cause damage to the insulating coated layer of the conductor segment is generally equal to or more than the sheet width w, and, in order for the projecting curve part 14c of one conductor segment 14 not to interfere with the projecting curve part 14c of an adjacent conductor segment 14, the adjacent conductor segment 14 needs to be displaced in the circumferential direction of the stator core 11 by $\sqrt{\{(r+w)^2-r^2\}}$ or more (r is bend radius, w is sheet width), i.e. $\sqrt{3}w$ or more when r=w, and, at this time, in order for the inclined part 14b of the one conductor segment 14 not to interfere with the inclined part 14b of the adjacent conductor segment 14, w/sin θ1 that is a width of the inclined part 14b in the circumferential direction of the stator core 11 needs to be smaller than the distance, i.e. w/sin θ1<$\sqrt{3}$w.

When manufacturing the conductor segment 14, first, a rod-shaped member having a radius of the minimum R is prepared.

Next, the inner surface of a part corresponding to one connection part 14e of a wire rod obtained by performing enamel coating (insulating coating) on the outer periphery of the conductor strand having a substantially rectangular cross section is bent using the above-described rod-shaped member such that the inclination angle of a part to be one inclined part 14b is θ1.

After that, the outer surface of a part corresponding to one connection part 14f is bent using the rod-shaped member such that a part to be the projecting curve part 14c projects, and the inner surface of the part to be the projecting curve part 14c is bent using the rod-shaped member.

Then, the outer surface of a part corresponding to the other connection part 14f is bent using the rod-shaped member such that the other inclined part 14b is symmetrical to the one inclined part 14b.

Finally, the inner surface of a part corresponding to the other connection part 14e is bent using the rod-shaped member such that the other linear part 14a is parallel to one linear part 14a. Accordingly, the conductor segment 14 is completed.

As just described, in each of the conductor segments 14, the connection parts 14e between the respective pair of linear parts 14a and the respective pair of inclined parts 14b, the curved part of the projecting curve part 14c, and the connection parts 14f between the apical ends of the respective pair of inclined parts 14b and the projecting curve part 14c are all bent parts having the same bend radius r of the minimum R, and each of the conductor segments 14 can be manufactured using one rod-shaped member having a radius of the minimum R in bending, and thus, the conductor segments 14, and eventually, the stator 10 can be manufactured by a simple manufacturing method.

Next, the wire connection method of the plurality of stator windings 13 using the plurality of conductor segments 14 will be described with reference to FIG. 8 to FIG. 14.

First, in terms of a first U-phase stator winding 13 among the four U-phase stator windings 13, as illustrated in FIG. 9, one linear part 14a of one conductor segment 14 is inserted in the second from the inside of the first slot $12_1$, and the other linear part 14a is inserted in the first from the inside of the seventh slot $12_7$. The one linear part 14a of the conductor segment 14, which is inserted in the second from the inside of the first slot $12_1$, is connected to a U-phase terminal.

In the same manner as this, one linear part 14a of another conductor segment 14 is inserted in the second from the inside of the 13th slot $12_{13}$, and the other linear part 14a is inserted in the first from the inside of the 19th slot $12_{19}$.

In addition, in the same manner, one linear part 14a of another conductor segment 14 is inserted in the second from the inside of the 25th slot $12_{25}$, and the other linear part 14a is inserted in the first from the inside of the 31st slot $12_{31}$.

Furthermore, in the same manner, one linear part 14a of another conductor segment 14 is inserted in the second from the inside of the 37th slot $12_{37}$, and the other linear part 14a is inserted in the first from the inside of the 43rd slot $12_{43}$.

In addition, in the same manner, one linear part 14a of another conductor segment 14 is inserted in the fourth from the inside of the first slot $12_1$, and the other linear part 14a is inserted in the third from the inside of the seventh slot $12_7$.

In addition, in the same manner, one linear part 14a of another conductor segment 14 is inserted in the fourth from the inside of the 13th slot $12_{13}$, and the other linear part 14a is inserted in the third from the inside of the 19th slot $12_{19}$.

In addition, in the same manner, one linear part 14a of another conductor segment 14 is inserted in the fourth from the inside of the 25th slot $12_{25}$, and the other linear part 14a is inserted in the third from the inside of the 31st slot $12_{31}$.

Furthermore, in the same manner, one linear part 14a of another conductor segment 14 is inserted in the fourth from the inside of the 37th slot $12_{37}$, and the other linear part 14a is inserted in the third from the inside of the 43rd slot $12_{43}$.

Next, in the process of wire connection of the first U-phase stator winding 13, wire connection of a second U-phase stator winding 13 is started, and, as illustrated in FIG. 9, one linear part 14a of one conductor segment 14 is inserted in the sixth from the inside of the first slot $12_1$, and the other linear part 14a is inserted in the fifth from the inside of the seventh slot $12_7$. The one linear part 14a of the conductor segment 14, which is inserted in the sixth from the inside of the first slot $12_1$, is connected to the U-phase terminal.

In the same manner as this, one linear part 14a of another conductor segment 14 is inserted in the sixth from the inside of the 13th slot $12_{13}$, and the other linear part 14*a* is inserted in the fifth from the inside of the 19th slot $12_{19}$.

In addition, in the same manner, one linear part 14*a* of another conductor segment 14 is inserted in the sixth from the inside of the 25th slot $12_{25}$, and the other linear part 14*a* is inserted in the fifth from the inside of the 31st slot $12_{31}$.

Furthermore, in the same manner, one linear part 14*a* of another conductor segment 14 is inserted in the sixth from the inside of the 37th slot $12_{37}$, and the other linear part 14*a* is inserted in the fifth from the inside of the 43rd slot $12_{43}$.

In addition, in the same manner, one linear part 14*a* of another conductor segment 14 is inserted in the eighth from the inside of the first slot $12_1$, and the other linear part 14*a* is inserted in the seventh from the inside of the seventh slot $12_7$.

In addition, in the same manner, one linear part 14*a* of another conductor segment 14 is inserted in the eighth from the inside of the 13th slot $12_{13}$, and the other linear part 14*a* is inserted in the seventh from the inside of the 19th slot $12_{19}$.

In addition, in the same manner, one linear part 14*a* of another conductor segment 14 is inserted in the eighth from the inside of the 25th slot $12_{25}$, and the other linear part 14*a* is inserted in the seventh from the inside of the 31st slot $12_{31}$.

Furthermore, in the same manner, one linear part 14*a* of another conductor segment 14 is inserted in the eighth from the inside of the 37th slot $12_{37}$, and the other linear part 14*a* is inserted in the seventh from the inside of the 43rd slot $12_{43}$.

Next, getting back to the wire connection of the first U-phase stator winding 13, as illustrated in FIG. 8A and FIG. 10, the end part 14*g* of the other linear part 14*a* of the conductor segment 14, which is inserted in the first from the inside of the seventh slot $12_7$, is bent in the circumferential direction toward the 13th slot $12_{13}$, the end part 14*g* of the one linear part 14*a* of the conductor segment 14, which is inserted in the second from the inside of the 13th slot $12_{13}$, is bent in the circumferential direction toward the seventh slot $12_7$, and the respective end parts 14*g* are bonded to each other by welding.

In addition, the end part 14*g* of the other linear part 14*a* of the conductor segment 14, which is inserted in the first from the inside of the 19th slot $12_{19}$, is bent in the circumferential direction toward the 25th slot $12_{25}$, the end part 14*g* of the one linear part 14*a* of the conductor segment 14, which is inserted in the second from the inside of the 25th slot $12_{25}$, is bent in the circumferential direction toward the 19th slot $12_{19}$, and the respective end parts 14*g* are bonded to each other by welding.

In addition, the end part 14*g* of the other linear part 14*a* of the conductor segment 14, which is inserted in the first from the inside of the 31st slot $12_{31}$, is bent in the circumferential direction toward the 37th slot $12_{37}$, the end part 14*g* of the one linear part 14*a* of the conductor segment 14, which is inserted in the second from the inside of the 37th slot $12_{37}$, is bent in the circumferential direction toward the 31st slot $12_{31}$, and the respective end parts 14*g* are bonded to each other by welding.

In addition, the end part 14*g* of the other linear part 14*a* of the conductor segment 14, which is inserted in the first from the inside of the 43rd slot $12_{43}$, is bent in the circumferential direction toward the first slot $12_1$, the end part 14*g* of the one linear part 14*a* of the conductor segment 14, which is inserted in the fourth from the inside of the first slot $12_1$, is bent in the circumferential direction toward the 43rd slot $12_{43}$, and the respective end parts 14*g* are bonded to each other by welding.

In addition, the end part 14*g* of the other linear part 14*a* of the conductor segment 14, which is inserted in the third from the inside of the seventh slot $12_7$, is bent in the circumferential direction toward the 13th slot $12_{13}$, the end part 14*g* of the one linear part 14*a* of the conductor segment 14, which is inserted in the fourth from the inside of the 13th slot $12_{13}$, is bent in the circumferential direction toward the seventh slot $12_7$, and the respective end parts 14*g* are bonded to each other by welding.

In addition, the end part 14*g* of the other linear part 14*a* of the conductor segment 14, which is inserted in the third from the inside of the 19th slot $12_{19}$, is bent in the circumferential direction toward the 25th slot $12_{25}$, the end part 14*g* of the one linear part 14*a* of the conductor segment 14, which is inserted in the fourth from the inside of the 25th slot $12_{25}$, is bent in the circumferential direction toward the 19th slot $12_{19}$, and the respective end parts 14*g* are bonded to each other by welding.

In addition, the end part 14*g* of the other linear part 14*a* of the conductor segment 14, which is inserted in the third from the inside of the 31st slot $12_{31}$, is bent in the circumferential direction toward the 37th slot $12_{37}$, the end part 14*g* of the one linear part 14*a* of the conductor segment 14, which is inserted in the fourth from the inside of the 37th slot $12_{37}$, is bent in the circumferential direction toward the 31st slot $12_{31}$, and the respective end parts 14*g* are bonded to each other by welding.

Next, getting back to the wire connection of the second U-phase stator winding 13, as illustrated in FIG. 8A and FIG. 10, the end part 14*g* of the other linear part 14*a* of the conductor segment 14, which is inserted in the fifth from the inside of the seventh slot $12_7$, is bent in the circumferential direction toward the 13th slot $12_{13}$, the end part 14*g* of the one linear part 14*a* of the conductor segment 14, which is inserted in the sixth from the inside of the 13th slot $12_{13}$, is bent in the circumferential direction toward the seventh slot $12_7$, and the respective end parts 14*g* are bonded to each other by welding.

In addition, the end part 14*g* of the other linear part 14*a* of the conductor segment 14, which is inserted in the fifth from the inside of the 19th slot $12_{19}$, is bent in the circumferential direction toward the 25th slot $12_{25}$, the end part 14*g* of the one linear part 14*a* of the conductor segment 14, which is inserted in the sixth from the inside of the 25th slot $12_{25}$, is bent in the circumferential direction toward the 19th slot $12_{19}$, and the respective end parts 14*g* are bonded to each other by welding.

In addition, the end part 14*g* of the other linear part 14*a* of the conductor segment 14, which is inserted in the fifth from the inside of the 31st slot $12_{31}$, is bent in the circumferential direction toward the 37th slot $12_{37}$, the end part 14*g* of the one linear part 14*a* of the conductor segment 14, which is inserted in the sixth from the inside of the 37th slot $12_{37}$, is bent in the circumferential direction toward the 31st slot $12_{31}$, and the respective end parts 14*g* are bonded to each other by welding.

In addition, the end part 14*g* of the other linear part 14*a* of the conductor segment 14, which is inserted in the fifth from the inside of the 43rd slot $12_{43}$, is bent in the circumferential direction toward the first slot $12_1$, the end part 14*g* of the one linear part 14*a* of the conductor segment 14, which is inserted in the eighth from the inside of the first slot $12_1$, is bent in the circumferential direction toward the 43rd slot $12_{43}$, and the respective end parts 14g are bonded to each other by welding.

In addition, the end part 14g of the other linear part 14a of the conductor segment 14, which is inserted in the seventh from the inside of the seventh slot $12_7$, is bent in the circumferential direction toward the 13th slot $12_{13}$, the end part 14g of the one linear part 14a of the conductor segment 14, which is inserted in the eighth from the inside of the 13th slot $12_{13}$, is bent in the circumferential direction toward the seventh slot $12_7$, and the respective end parts 14g are bonded to each other by welding.

In addition, the end part 14g of the other linear part 14a of the conductor segment 14, which is inserted in the seventh from the inside of the 19th slot $12_{19}$, is bent in the circumferential direction toward the 25th slot $12_{25}$, the end part 14g of the one linear part 14a of the conductor segment 14, which is inserted in the eighth from the inside of the 25th slot $12_{25}$, is bent in the circumferential direction toward the 19th slot $12_{19}$, and the respective end parts 14g are bonded to each other by welding.

In addition, the end part 14g of the other linear part 14a of the conductor segment 14, which is inserted in the seventh from the inside of the 31st slot $12_{31}$, is bent in the circumferential direction toward the 37th slot $12_{37}$, the end part 14g of the one linear part 14a of the conductor segment 14, which is inserted in the eighth from the inside of the 37th slot $12_{37}$, is bent in the circumferential direction toward the 31st slot $12_{31}$, and the respective end parts 14g are bonded to each other by welding.

Figure 11:
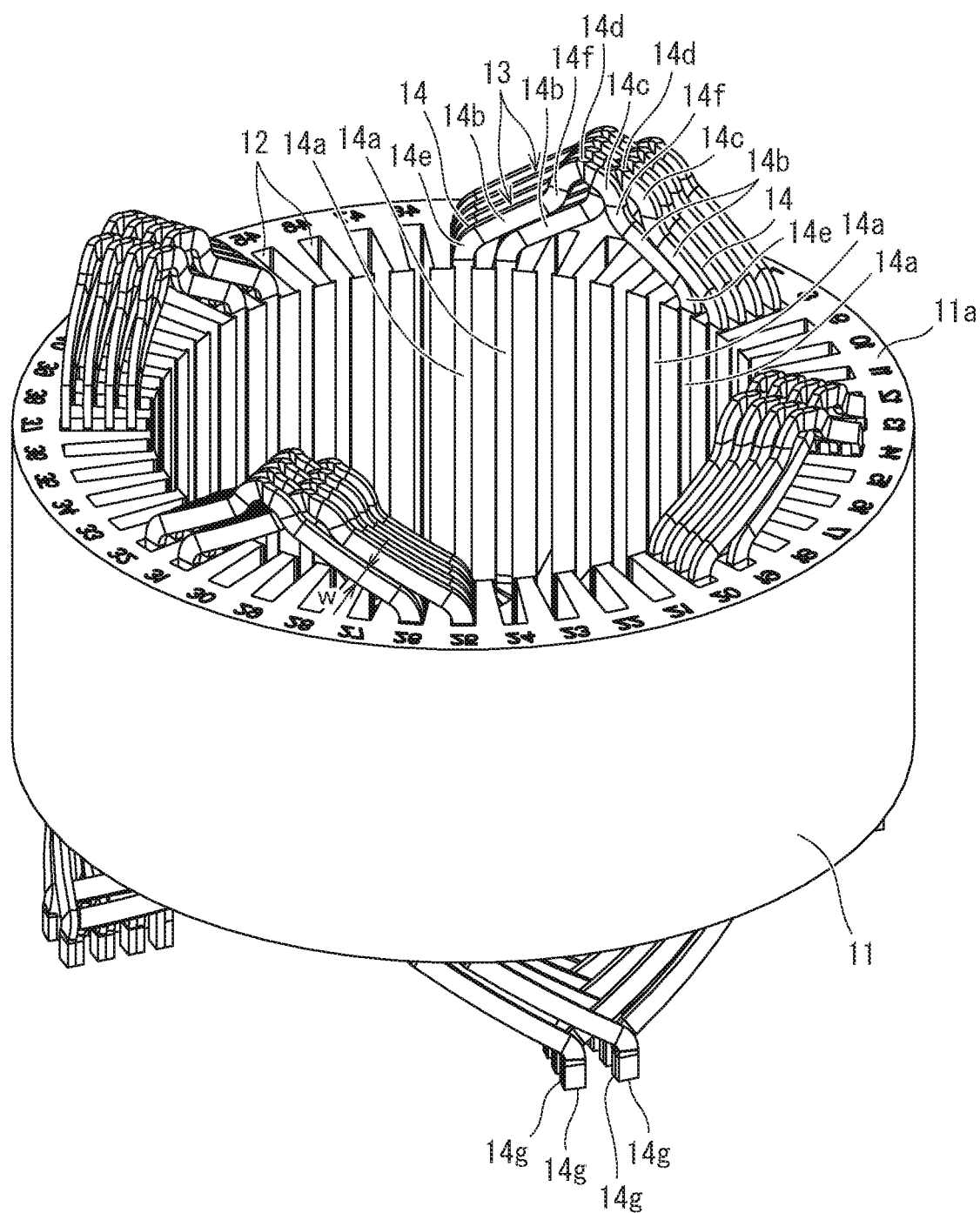
FIG. 11 is a perspective view of the stator in the state after the wire connection of the two U-phase stator windings, as viewed from obliquely above.

Next, getting back to the wire connection of the first U-phase stator winding 13, as illustrated in FIG. 8A and FIG. 11, one linear part 14a of another conductor segment 14 is inserted in the second from the inside of the second slot $12_2$, and the other linear part 14a is inserted in the first from the inside of the eighth slot $12_8$.

In the same manner as this, one linear part 14a of another conductor segment 14 is inserted in the second from the inside of the 14th slot $12_{14}$, and the other linear part 14a is inserted in the first from the inside of the 20th slot $12_{20}$.

In addition, in the same manner, one linear part 14a of another conductor segment 14 is inserted in the second from the inside of the 26th slot $12_{26}$, and the other linear part 14a is inserted in the first from the inside of the 32nd slot $12_{32}$.

Furthermore, in the same manner, one linear part 14a of another conductor segment 14 is inserted in the second from the inside of the 38th slot $12_{38}$, and the other linear part 14a is inserted in the first from the inside of the 44th slot $12_{44}$.

In addition, in the same manner, one linear part 14a of another conductor segment 14 is inserted in the fourth from the inside of the second slot $12_2$, and the other linear part 14a is inserted in the third from the inside of the eighth slot $12_8$.

In addition, in the same manner, one linear part 14a of another conductor segment 14 is inserted in the fourth from the inside of the 14th slot $12_{14}$, and the other linear part 14a is inserted in the third from the inside of the 20th slot $12_{20}$.

In addition, in the same manner, one linear part 14a of another conductor segment 14 is inserted in the fourth from the inside of the 26th slot $12_{26}$, and the other linear part 14a is inserted in the third from the inside of the 32nd slot $12_{32}$.

Furthermore, in the same manner, one linear part 14a of another conductor segment 14 is inserted in the fourth from the inside of the 38th slot $12_{38}$, and the other linear part 14a is inserted in the third from the inside of the 44th slot $12_{44}$.

Next, getting back to the wire connection of the second U-phase stator winding 13, as illustrated in FIG. 8A and FIG. 11, one linear part 14a of a conductor segment 14 is inserted in the sixth from the inside of the second slot $12_2$, and the other linear part 14a is inserted in the fifth from the inside of the eighth slot $12_8$.

In the same manner as this, one linear part 14a of another conductor segment 14 is inserted in the sixth from the inside of the 14th slot $12_{13}$, and the other linear part 14a is inserted in the fifth from the inside of the 20th slot $12_{20}$.

In addition, in the same manner, one linear part 14a of another conductor segment 14 is inserted in the sixth from the inside of the 26th slot $12_{26}$, and the other linear part 14a is inserted in the fifth from the inside of the 32nd slot $12_{32}$.

Furthermore, in the same manner, one linear part 14a of another conductor segment 14 is inserted in the sixth from the inside of the 38th slot $12_{38}$, and the other linear part 14a is inserted in the fifth from the inside of the 44th slot $12_{44}$.

In addition, in the same manner, one linear part 14a of another conductor segment 14 is inserted in the eighth from the inside of the second slot $12_2$, and the other linear part 14a is inserted in the seventh from the inside of the eighth slot $12_8$.

In addition, in the same manner, one linear part 14a of another conductor segment 14 is inserted in the eighth from the inside of the 14th slot $12_{14}$, and the other linear part 14a is inserted in the seventh from the inside of the 20th slot $12_{20}$.

In addition, in the same manner, one linear part 14a of another conductor segment 14 is inserted in the eighth from the inside of the 26th slot $12_{26}$, and the other linear part 14a is inserted in the seventh from the inside of the 32nd slot $12_{32}$.

Furthermore, in the same manner, one linear part 14a of another conductor segment 14 is inserted in the eighth from the inside of the 38th slot $12_{38}$, and the other linear part 14a is inserted in the seventh from the inside of the 44th slot $12_{44}$.

Figure 12:
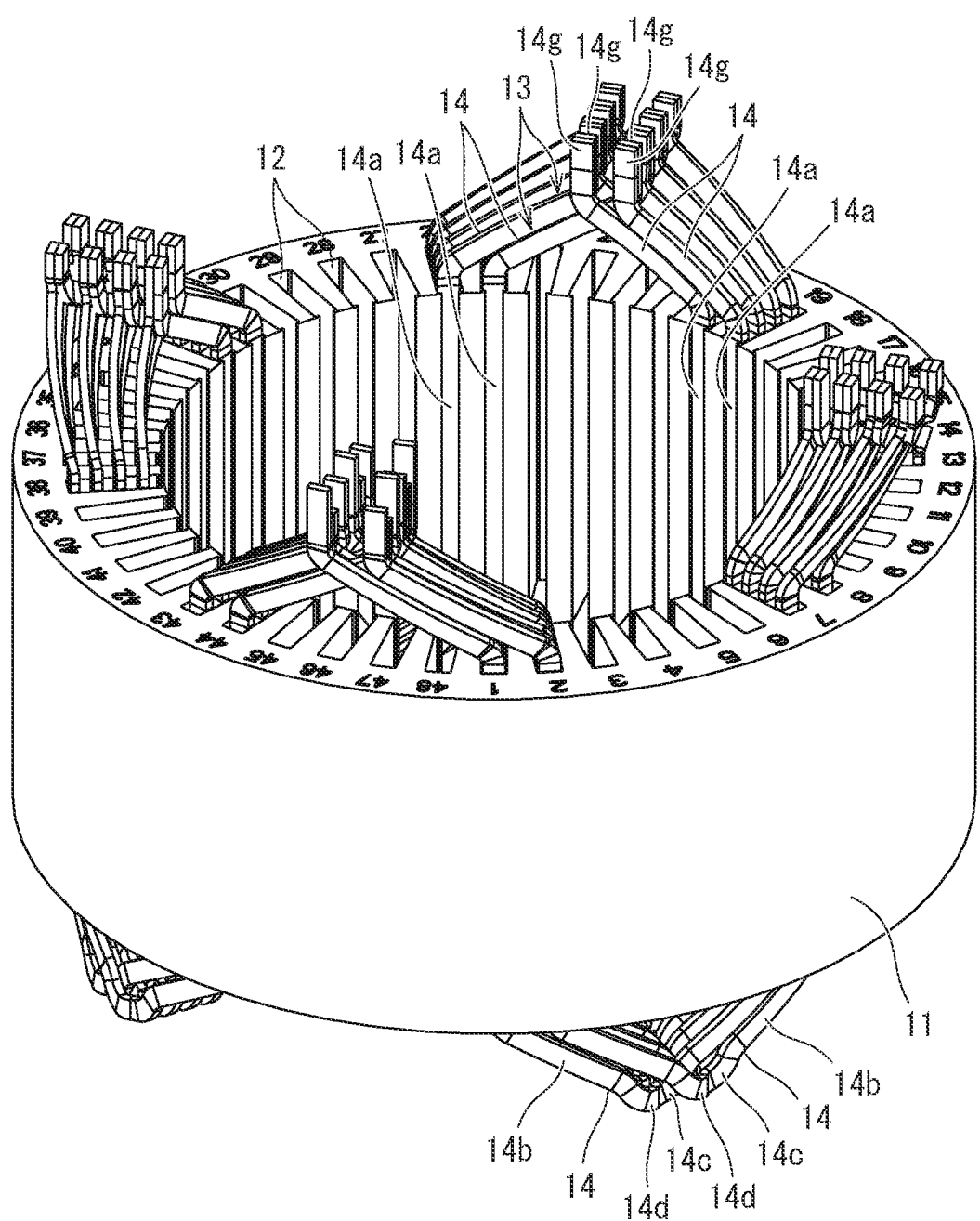
FIG. 12 is a perspective view of the stator in the state after the wire connection of the two U-phase stator windings illustrated in FIG. 11, as viewed from obliquely below.

Next, getting back to the wire connection of the first U-phase stator winding 13, as illustrated in FIG. 8A and FIG. 12, the end part 14g of the other linear part 14a of the conductor segment 14, which is inserted in the third from the inside of the 43rd slot $_{43}$, is bent in the circumferential direction toward the second slot $12_2$, the end part 14g of the one linear part 14a of the conductor segment 14, which is inserted in the second from the inside of the second slot $12_2$, is bent in the circumferential direction toward the 43rd slot $12_{43}$, and the respective end parts 14g are bonded to each other by welding.

In addition, the end part 14g of the other linear part 14a of the conductor segment 14, which is inserted in the first from the inside of the eighth slot $12_8$, is bent in the circumferential direction toward the 14th slot $12_{14}$, the end part 14g of the one linear part 14a of the conductor segment 14, which is inserted in the second from the inside of the 14th slot $12_{14}$, is bent in the circumferential direction toward the eighth slot $12_8$, and the respective end parts 14g are bonded to each other by welding.

In addition, the end part 14g of the other linear part 14a of the conductor segment 14, which is inserted in the first from the inside of the 20th slot $12_{20}$, is bent in the circumferential direction toward the 26th slot $12_{26}$, the end part 14g of the one linear part 14a of the conductor segment 14, which is inserted in the second from the inside of the 26th slot $12_{26}$, is bent in the circumferential direction toward the 20th slot $12_{20}$, and the respective end parts 14g are bonded to each other by welding.

In addition, the end part 14g of the other linear part 14a of the conductor segment 14, which is inserted in the first from the inside of the 32nd slot $12_{32}$, is bent in the circumferential direction toward the 38th slot $12_{38}$, the end part $14g$ of the one linear part $14a$ of the conductor segment 14, which is inserted in the second from the inside of the 38th slot $12_{38}$, is bent in the circumferential direction toward the 32nd slot $12_{32}$, and the respective end parts $14g$ are bonded to each other by welding.

In addition, the end part $14g$ of the other linear part $14a$ of the conductor segment 14, which is inserted in the first from the inside of the 44th slot $12_{44}$, is bent in the circumferential direction toward the second slot $12_2$, the end part $14g$ of the one linear part $14a$ of the conductor segment 14, which is inserted in the fourth from the inside of the second slot $12_2$, is bent in the circumferential direction toward the 44th slot $12_{44}$, and the respective end parts $14g$ are bonded to each other by welding.

In addition, the end part $14g$ of the other linear part $14a$ of the conductor segment 14, which is inserted in the third from the inside of the eighth slot $12_8$, is bent in the circumferential direction toward the 14th slot $12_{14}$, the end part $14g$ of the one linear part $14a$ of the conductor segment 14, which is inserted in the fourth from the inside of the 14th slot $12_{14}$, is bent in the circumferential direction toward the eighth slot $12_8$, and the respective end parts $14g$ are bonded to each other by welding.

In addition, the end part $14g$ of the other linear part $14a$ of the conductor segment 14, which is inserted in the third from the inside of the 20th slot $12_{20}$, is bent in the circumferential direction toward the 26th slot $12_{26}$, the end part $14g$ of the one linear part $14a$ of the conductor segment 14, which is inserted in the fourth from the inside of the 26th slot $12_{26}$, is bent in the circumferential direction toward the 20th slot $12_{20}$, and the respective end parts $14g$ are bonded to each other by welding.

In addition, the end part $14g$ of the other linear part $14a$ of the conductor segment 14, which is inserted in the third from the inside of the 32nd slot $12_{32}$, is bent in the circumferential direction toward the 38th slot $12_{38}$, the end part $14g$ of the one linear part $14a$ of the conductor segment 14, which is inserted in the fourth from the inside of the 38th slot $12_{38}$, is bent in the circumferential direction toward the 32nd slot $12_{32}$, and the respective end parts $14g$ are bonded to each other by welding.

The end part $14g$ of the other linear part $14a$ of the conductor segment 14 in which the one linear part $14a$ is inserted in the fourth from the inside of the 38th slot $12_{38}$ and the other linear part $14a$ is inserted in the third from the inside of the 44th slot $12_{44}$ is connected to a neutral point. Accordingly, the wire connection of the first U-phase stator winding 13 is finished.

Next, getting back to the wire connection of the second U-phase stator winding 13, as illustrated in FIG. 8A and FIG. 12, the end part $14g$ of the other linear part $14a$ of the conductor segment 14, which is inserted in the seventh from the inside of the 43rd slot $12_{43}$, is bent in the circumferential direction toward the second slot $12_2$, the end part $14g$ of the one linear part $14a$ of the conductor segment 14, which is inserted in the sixth from the inside of the second slot $12_2$, is bent in the circumferential direction toward the 43rd slot $12_{43}$, and the respective end parts $14g$ are bonded to each other by welding.

In addition, the end part $14g$ of the other linear part $14a$ of the conductor segment 14, which is inserted in the fifth from the inside of the eighth slot $12_8$, is bent in the circumferential direction toward the 14th slot $12_{14}$, the end part $14g$ of the one linear part $14a$ of the conductor segment 14, which is inserted in the sixth from the inside of the 14th slot $12_{14}$, is bent in the circumferential direction toward the eighth slot $12_8$, and the respective end parts $14g$ are bonded to each other by welding.

In addition, the end part $14g$ of the other linear part $14a$ of the conductor segment 14, which is inserted in the fifth from the inside of the 20th slot $12_{20}$, is bent in the circumferential direction toward the 26th slot $12_{26}$, the end part $14g$ of the one linear part $14a$ of the conductor segment 14, which is inserted in the sixth from the inside of the 26th slot $12_{26}$, is bent in the circumferential direction toward the 20th slot $12_{20}$, and the respective end parts $14g$ are bonded to each other by welding.

In addition, the end part $14g$ of the other linear part $14a$ of the conductor segment 14, which is inserted in the fifth from the inside of the 32nd slot $12_{32}$, is bent in the circumferential direction toward the 38th slot $12_{38}$, the end part $14g$ of the one linear part $14a$ of the conductor segment 14, which is inserted in the sixth from the inside of the 38th slot $12_{38}$, is bent in the circumferential direction toward the 32nd slot $12_{32}$, and the respective end parts $14g$ are bonded to each other by welding.

In addition, the end part $14g$ of the other linear part $14a$ of the conductor segment 14, which is inserted in the fifth from the inside of the 44th slot $12_{44}$, is bent in the circumferential direction toward the second slot $12_2$, the end part $14g$ of the one linear part $14a$ of the conductor segment 14, which is inserted in the eighth from the inside of the second slot $12_2$, is bent in the circumferential direction toward the 44th slot $12_{44}$, and the respective end parts $14g$ are bonded to each other by welding.

In addition, the end part $14g$ of the other linear part $14a$ of the conductor segment 14, which is inserted in the seventh from the inside of the eighth slot $12_8$, is bent in the circumferential direction toward the 14th slot $12_{14}$, the end part $14g$ of the one linear part $14a$ of the conductor segment 14, which is inserted in the eighth from the inside of the 14th slot $12_{14}$, is bent in the circumferential direction toward the eighth slot $12_8$, and the respective end parts $14g$ are bonded to each other by welding.

In addition, the end part $14g$ of the other linear part $14a$ of the conductor segment 14, which is inserted in the seventh from the inside of the 20th slot $12_{20}$, is bent in the circumferential direction toward the 26th slot $12_{26}$, the end part $14g$ of the one linear part $14a$ of the conductor segment 14, which is inserted in the eighth from the inside of the 26th slot $12_{26}$, is bent in the circumferential direction toward the 20th slot $12_{20}$, and the respective end parts $14g$ are bonded to each other by welding.

In addition, the end part $14g$ of the other linear part $14a$ of the conductor segment 14, which is inserted in the seventh from the inside of the 32nd slot $12_{32}$, is bent in the circumferential direction toward the 38th slot $12_{38}$, the end part $14g$ of the one linear part $14a$ of the conductor segment 14, which is inserted in the eighth from the inside of the 38th slot $12_{38}$, is bent in the circumferential direction toward the 32nd slot $12_{32}$, and the respective end parts $14g$ are bonded to each other by welding.

The end part $14g$ of the other linear part $14a$ of the conductor segment 14 in which the one linear part $14a$ is inserted in the eighth from the inside of the 38th slot $12_{38}$ and the other linear part $14a$ is inserted in the seventh from the inside of the 44th slot $12_{44}$ is connected to the neutral point. Accordingly, the wire connection of the second U-phase stator winding 13 is finished.

Figure 13:
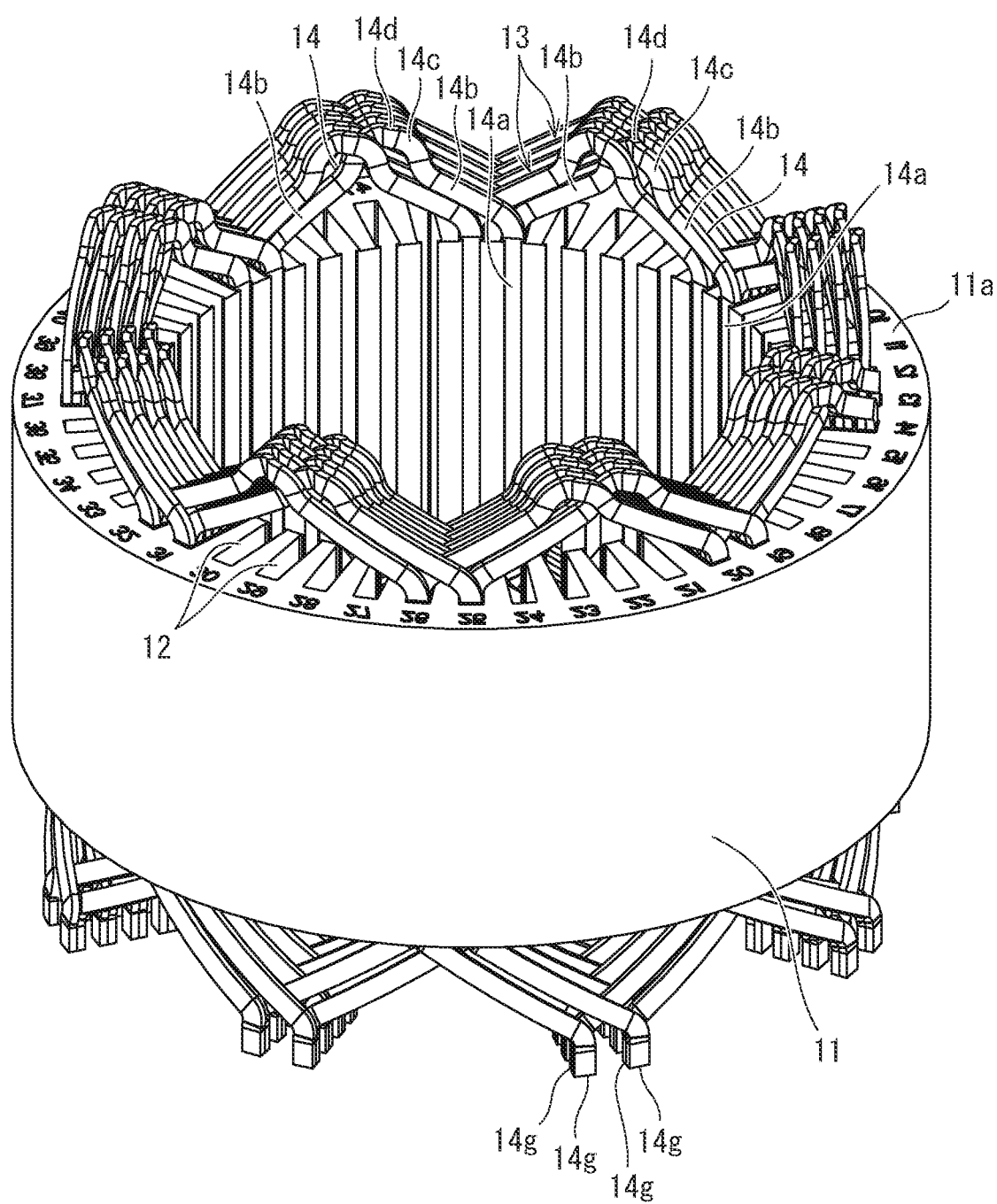
FIG. 13 is a perspective view of the stator in the state after the wire connection of the four U-phase stator windings, as viewed from obliquely above.
Figure 14:
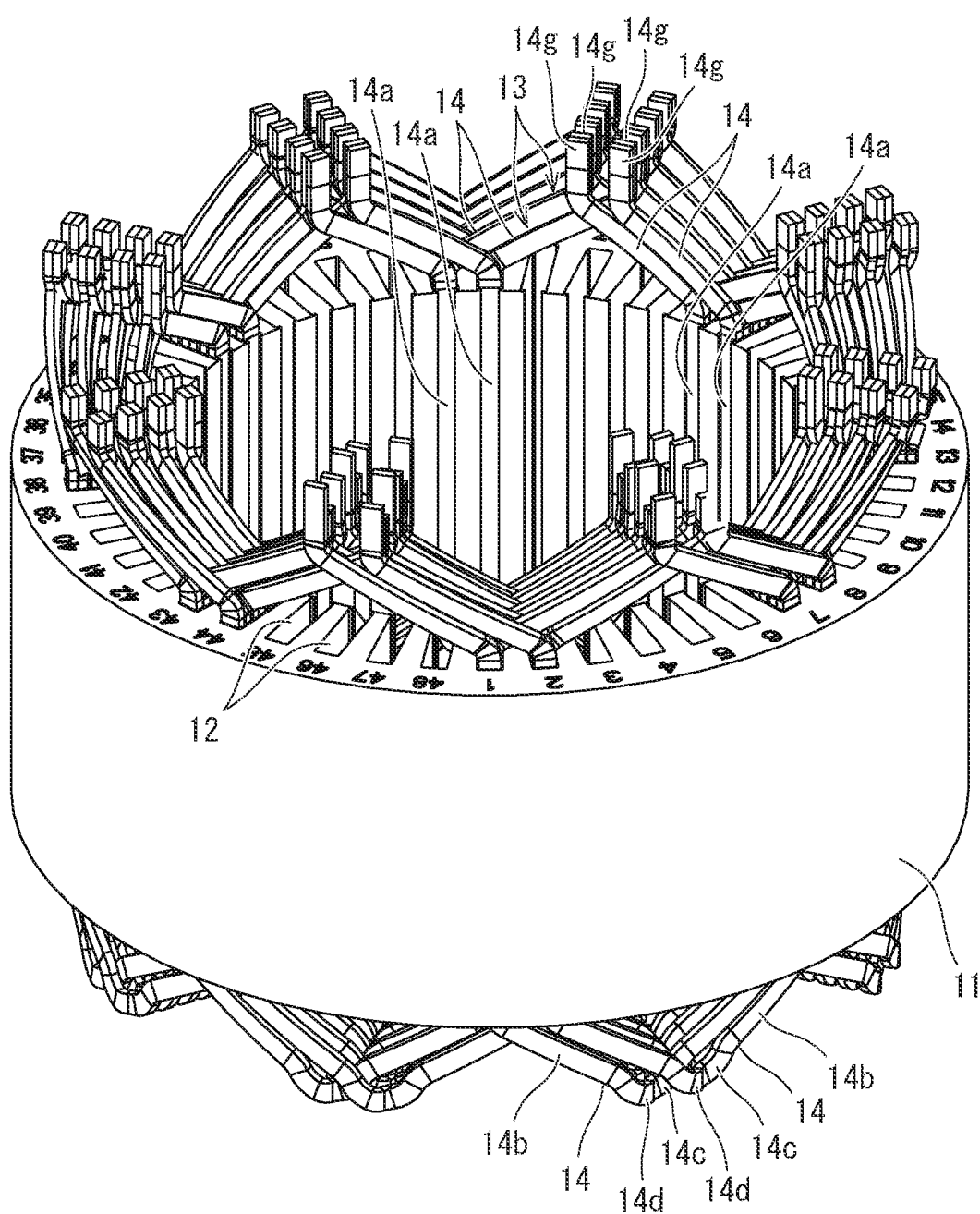
FIG. 14 is a perspective view of the stator in the state after the wire connection of the four U-phase stator windings illustrated in FIG. 13, as viewed from obliquely below.

Next, regarding the wire connection method of a third U-phase stator winding 13 and a fourth U-phase stator winding 13 among the four U-phase stator windings 13, although the detailed description thereof is omitted, as illustrated in FIG. 8B, FIG. 13, and FIG. 14, the third U-phase stator winding 13 and the fourth U-phase stator winding 13 are wire-connected in a direction opposite to the wire connection method of the first U-phase stator winding 13 and the second U-phase stator winding 13 in the circumferential direction at positions not overlapped with the first U-phase stator winding 13 and the second U-phase stator winding 13 in the same slots as the slots 12 in which the first U-phase stator winding 13 and the second U-phase stator winding 13 are placed.

In addition, regarding the wire connection method of the four V-phase stator windings 13, the four V-phase stator windings 13 are wire-connected in the same manner as the four U-phase stator windings 13 except that the four V-phase stator windings 13 are placed in the third slot $12_3$ and the fourth slot $12_4$, the ninth slot $12_9$ and the 10th slot $12_{10}$, the 15th slot $12_{15}$ and the 16th slot $12_{16}$, the 21st slot $12_{21}$ and the 22nd slot $12_{22}$, the 27th slot $12_{27}$ and the 28th slot $12_{28}$, the 33rd slot $12_{33}$ and the 34th slot $12_{34}$, the 39th slot $12_{39}$ and the 40th slot $12_{40}$, and the 45th slot $12_{45}$ and the 46th slot $12_{46}$, each of which are adjacent in the circumferential direction.

Furthermore, also regarding the wire connection method of the four W-phase stator windings 13, the four W-phase stator windings 13 are wire-connected in the same manner as the four U-phase stator windings 13 except that the respective four W-phase stator windings 13 are placed in the fifth slot $12_5$ and the sixth slot $12_6$, the 11th slot $12_{11}$ and the 12th slot $12_{12}$, the 17th slot $12_{17}$ and the 18th slot $12_{18}$, the 23rd slot $12_{23}$ and the 24th slot $12_{24}$, the 29th slot $12_{29}$ and the 30th slot $12_{30}$, the 35th slot $12_{35}$ and the 36th slot $12_{36}$, the 41st slot $12_{41}$ and the 42nd slot $12_{42}$, and the 47th slot $12_{47}$ and the 48th slot $12_{48}$, each of which are adjacent in the circumferential direction.

Figure 15:
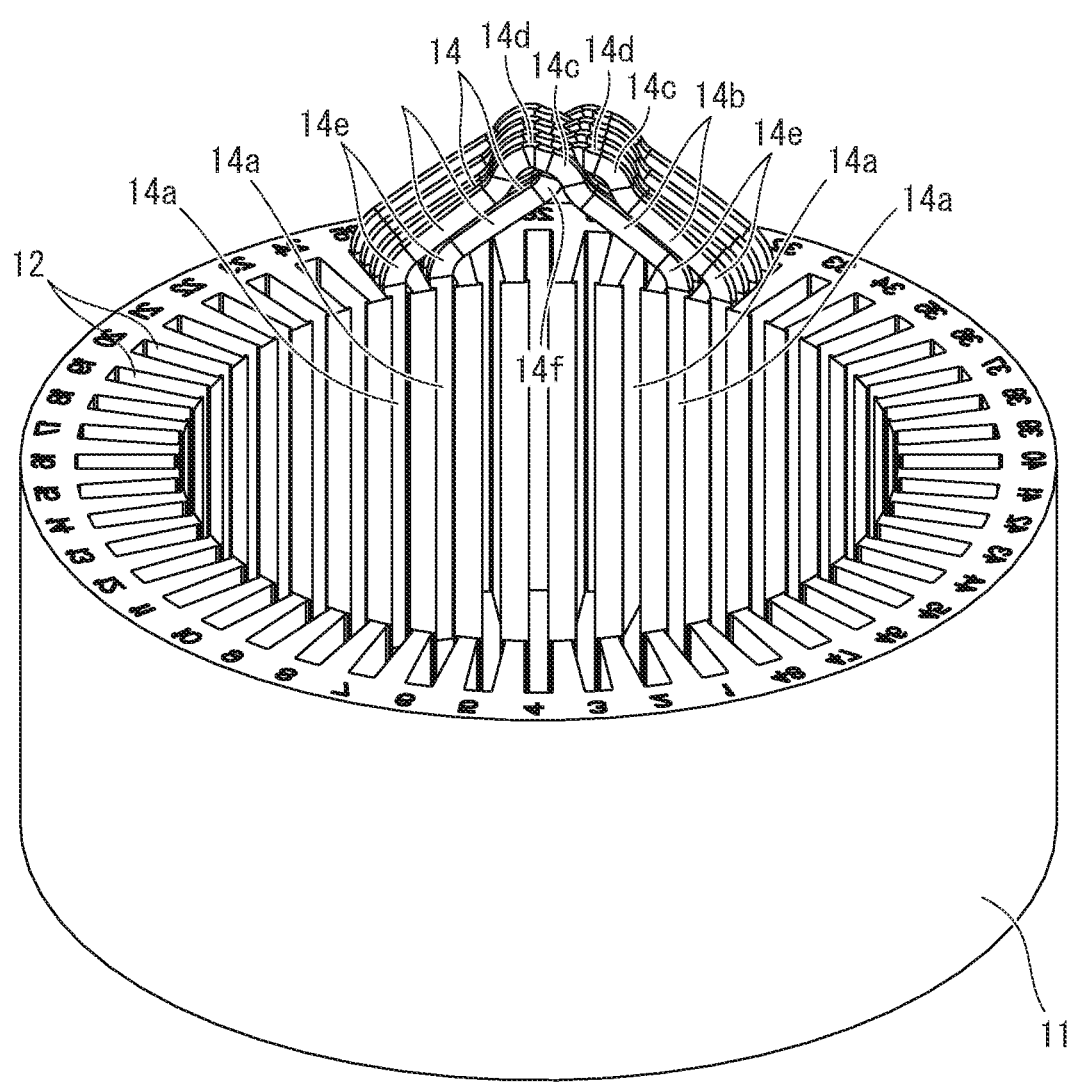
FIG. 15 is a perspective view for describing the non-interference state of adjacent conductor segments in the stator illustrated in FIG. 2, however, in FIG. 15, only two adjacent conductor segments are illustrated for the purpose of illustration.
Figure 16A:
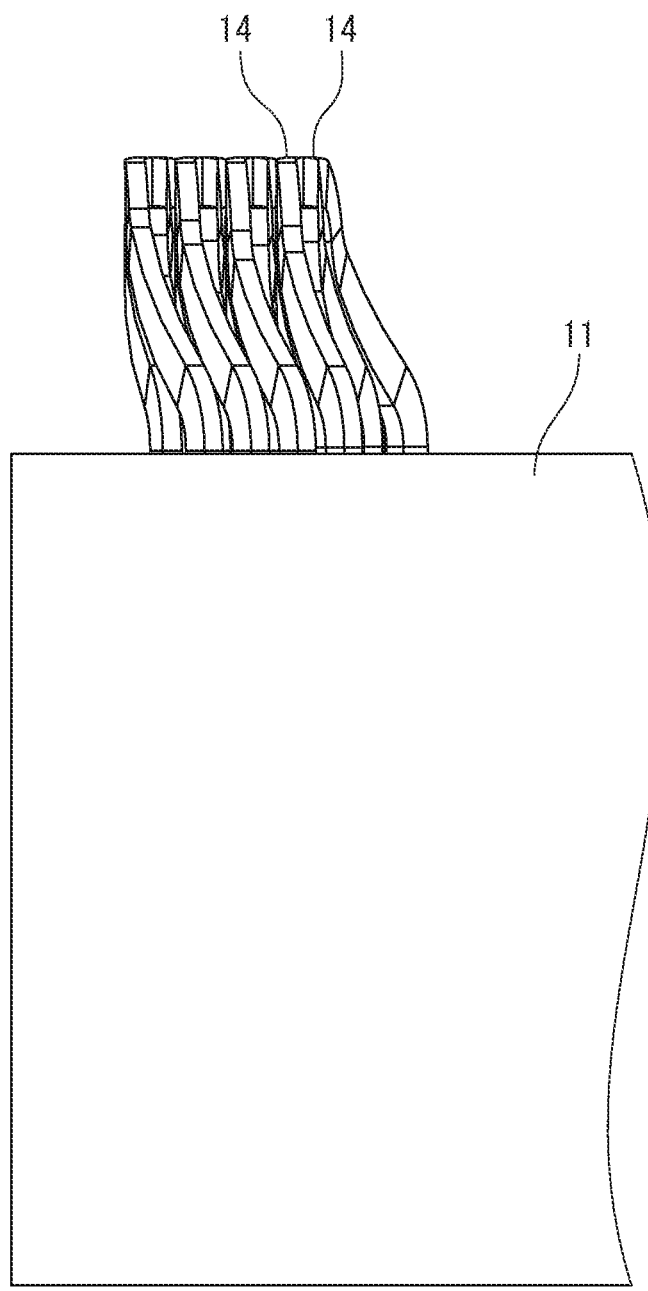
FIG. 16A is a left side view.
Figure 16B:
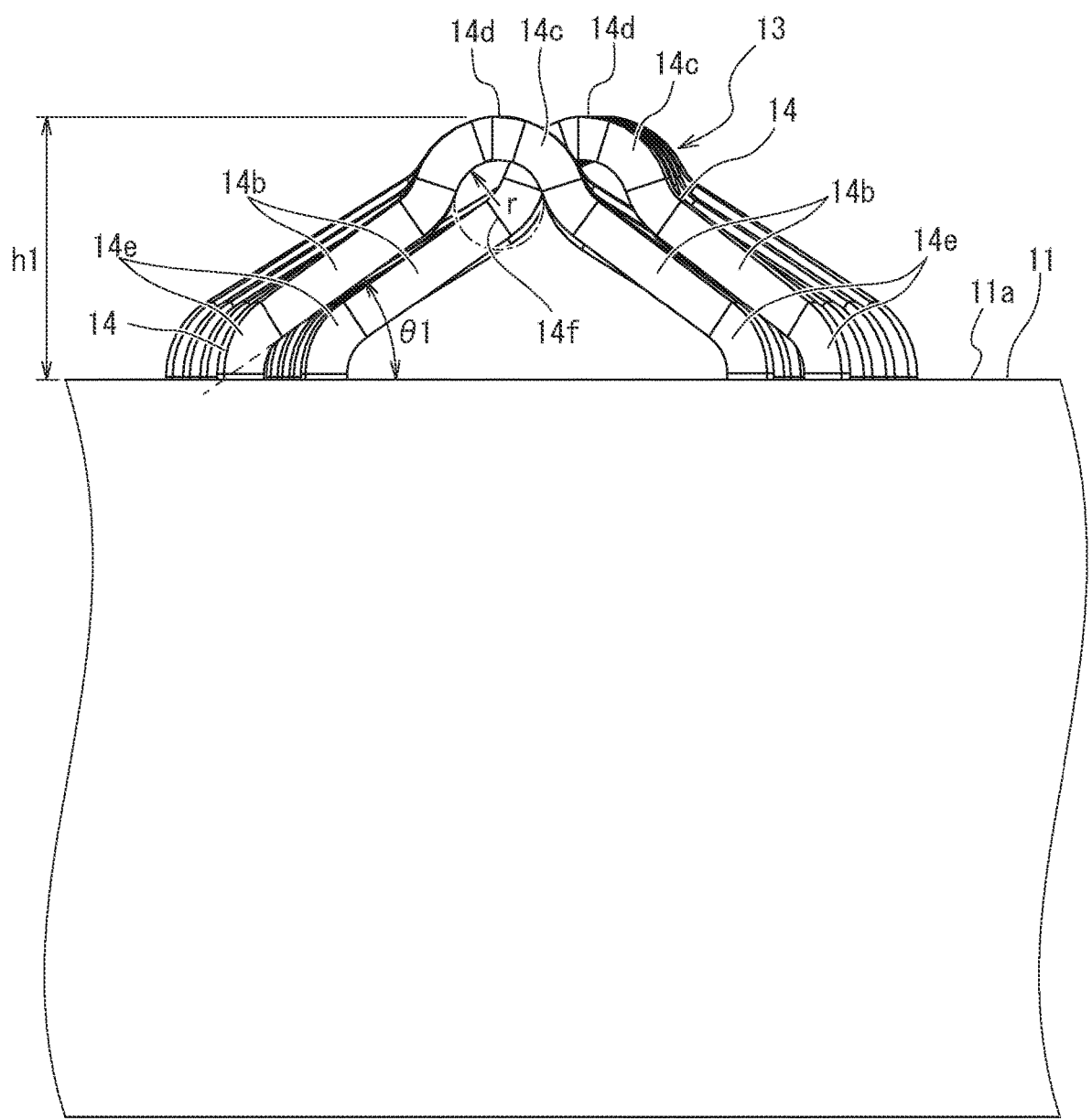
FIG. 16B is a front view.
Figure 16C:
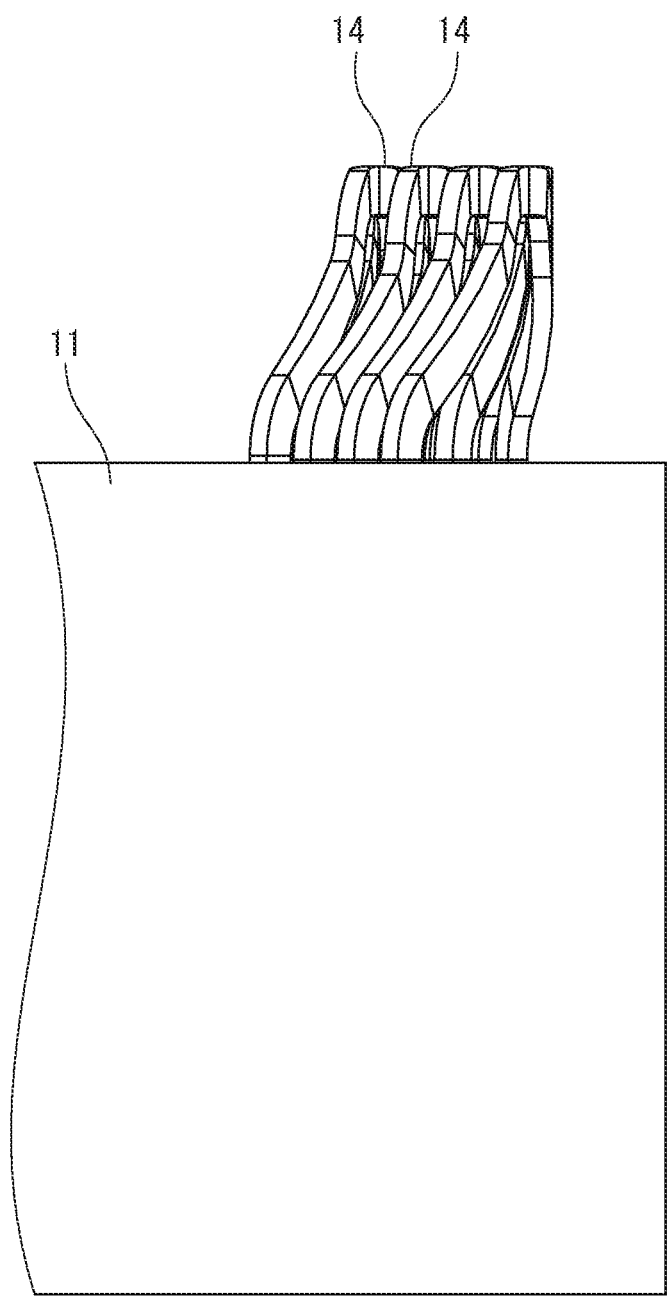
FIG. 16C is a right side view for describing the non-interference state of adjacent conductor segments in the stator illustrated in FIG. 2.

Next, the description is provided with reference to FIG. 15 and FIG. 16 so as to state that, in the stator illustrated in FIG. 2, a coil end height can be reduced without interference between adjacent conductor segments 14 and without damage of the insulating coating.

When the plurality of stator windings 13 is placed in the stator core 11, as illustrated in FIG. 16B, the respective conductor segments 14 of the respective stator windings 13 project from the axis-direction end surface 11a of the stator core 11 by a predetermined height h1. The height h1 is referred to as the coil end height.

Here, as illustrated in FIG. 5 and FIG. 16B, the crank-shaped part 14d of one of adjacent conductor segments 14 passes over the connection part 14f between the projecting curve part 14c and the inclined part 14b of the other of the adjacent conductor segments 14. On this case, the connection part 14f between the projecting curve part 14c and the inclined part 14b of the other of the adjacent conductor segments 14 is provided on the base side of the projecting curve part 14c, and thus, is located under the crank-shaped part 14d of the one of the adjacent conductor segments 14 with a gap therebetween. Therefore, the crank-shaped part 14d of the one of the adjacent conductor segments 14 does not interfere with the connection part 14f. In other words, this is because, in the other of the adjacent conductor segments 14, the projecting curve part 14c forming the crank-shaped part 14d connects the apical ends of the pair of inclined parts 14b to each other and curves and projects toward the outside in the axis direction, and thus, the position of the connection part 14f between the projecting curve part 14c and the inclined part 14b is relatively lowered.

The coil end height h1 is kept lower than a coil end height h2 described below, and the coil end height can be reduced.

In addition, the projecting curve part 14c is bent by the bend radius r of the minimum R, which is equal to or more than the sheet width w of the conductor segment 14, and thus, the damage of the insulating coating (enamel coating) of the conductor segment 14 due to a too small bend radius is not generated.

Therefore, according to the stator 10 and the rotating electrical machine 1 according to the present embodiment, the coil end height h1 can be reduced without interference between adjacent conductor segments 14 and without damage of the insulating coating. In addition, as described above, in each of the conductor segments 14, the connection parts 14e between the respective pair of linear parts 14a and the respective pair of inclined parts 14b, the curved part of the projecting curve part 14c, and the connection parts 14f between the apical ends of the respective pair of inclined parts 14b and the projecting curve part 14c are all bent parts having the same bend radius of the minimum R, and each of the conductor segments 14 can be manufactured using one rod-shaped member having a radius of the minimum R in bending, and thus, the conductor segments 14, and eventually, the stator 10 can be manufactured by a simple manufacturing method.

Next, the case where each of the conductor segments 14 is composed of the pair of linear parts 14a, the pair of inclined parts 14b, a curve part 14h that connects the apical ends of the pair of inclined parts 14b to each other, and the crank-shaped part 14d formed in the curve part 14h, and the conductor segments in each of which a bend radius r1 inside the curve part 14h is smaller than the minimum R are used will be described with reference to FIG. 17 and FIG. 18.

In this case, when the coil end height is made to be h1, the same as the case illustrated in FIG. 15 and FIG. 16, an inclination angle θ2 of the pair of inclined parts 14b with respect to the axis-direction end surface 11a of the stator core 11 becomes larger than the above-described inclination angle θ1.

Figure 18A:
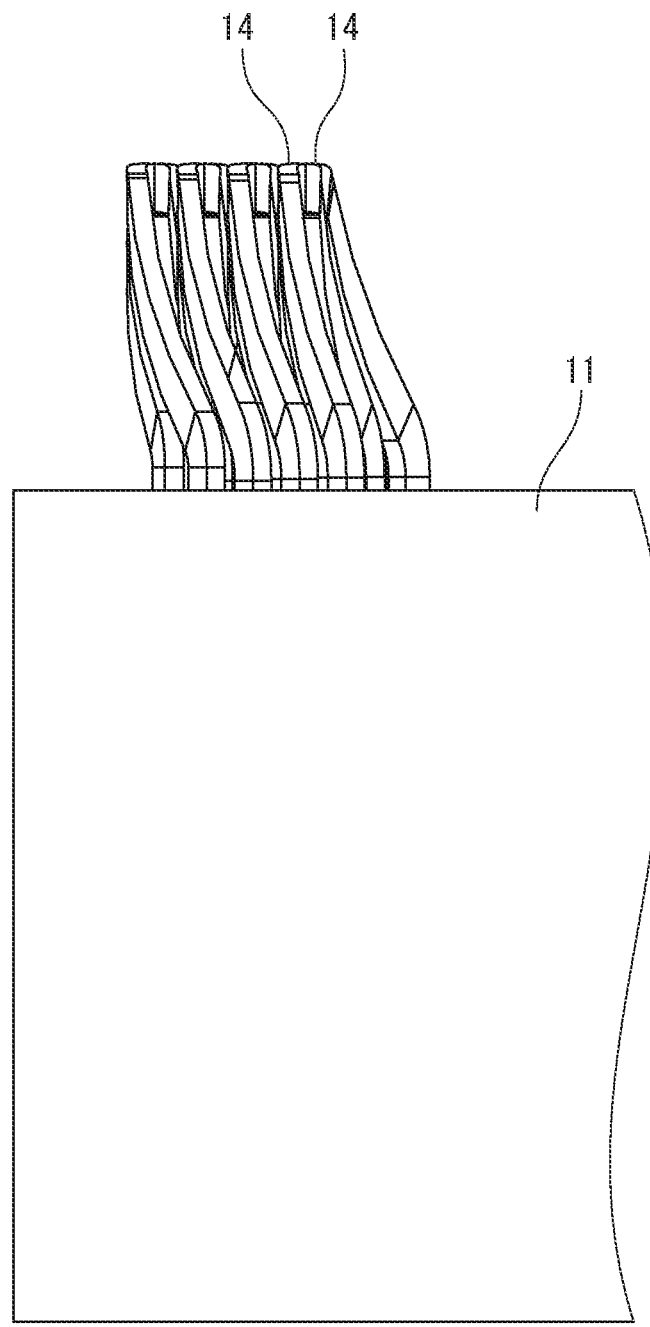
FIG. 18A is a left side view.
Figure 18B:
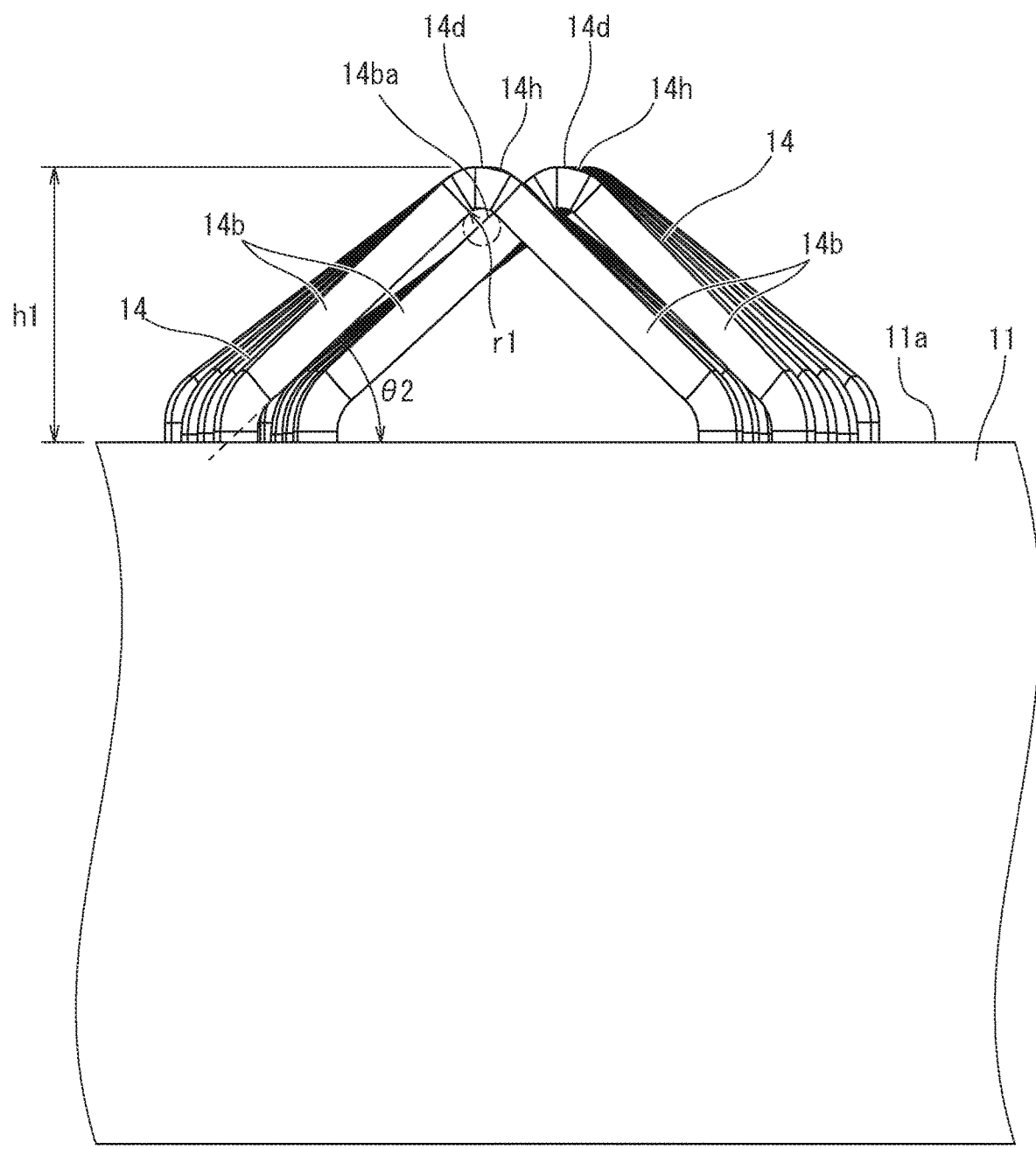
FIG. 18B is a front view.

Here, as illustrated in FIG. 18B, the crank-shaped part 14d of one of adjacent conductor segments 14 passes over the inclined part 14b of the other of the adjacent conductor segments 14. On this case, an upper corner edge 14ba of the inclined part 14b of the other of the adjacent conductor segments 14 is located under the crank-shaped part 14d of the one of the adjacent conductor segments 14 with a gap therebetween. This is because, since the bend radius r1 inside the curve part 14h of the other of the adjacent conductor segments 14 is smaller than the minimum R, an inclination starting point of the inclined part 14b of the other of the adjacent conductor segments 14 is close to the side of the curve part 14h and is away from the crank-shaped part 14d of the one of the adjacent conductor segments 14, and thus, the upper corner edge 14ba of the inclined part 14b of the other of the adjacent conductor segments 14 is lowered downward at the position of the crank-shaped part 14d.

Figure 17:
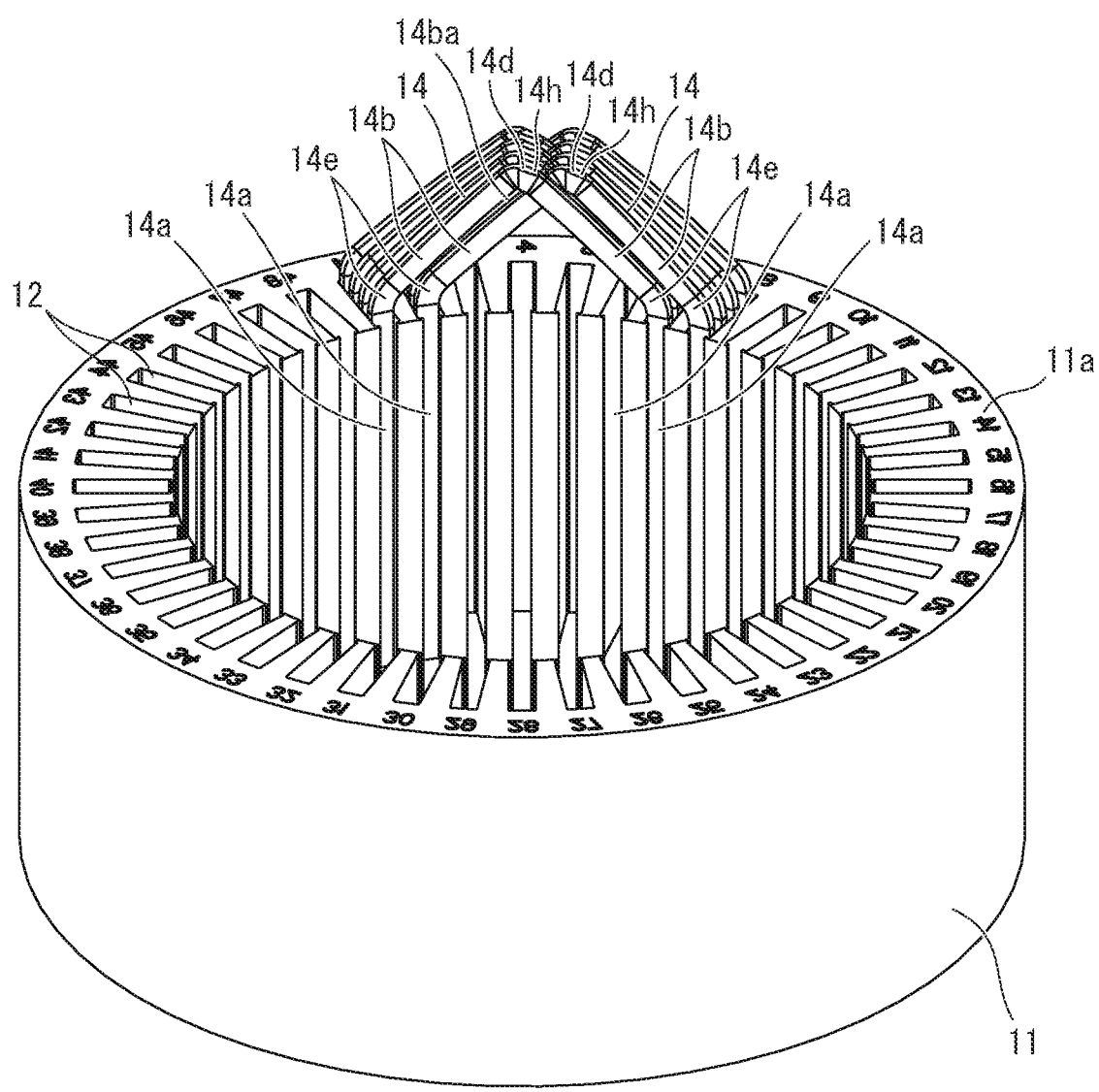
FIG. 17 is a perspective view for describing the non-interference state of adjacent conductor segments in the case where each of the conductor segments is composed of a pair of linear parts, a pair of inclined parts, a curve part that connects apical ends of the pair of inclined parts to each other, and a crank-shaped part formed in the curve part, and the conductor segments in each of which a bend radius inside the curve part is smaller than the minimum R are used, however, in FIG. 17, only two adjacent conductor segments are illustrated for the purpose of illustration.
Figure 18C:
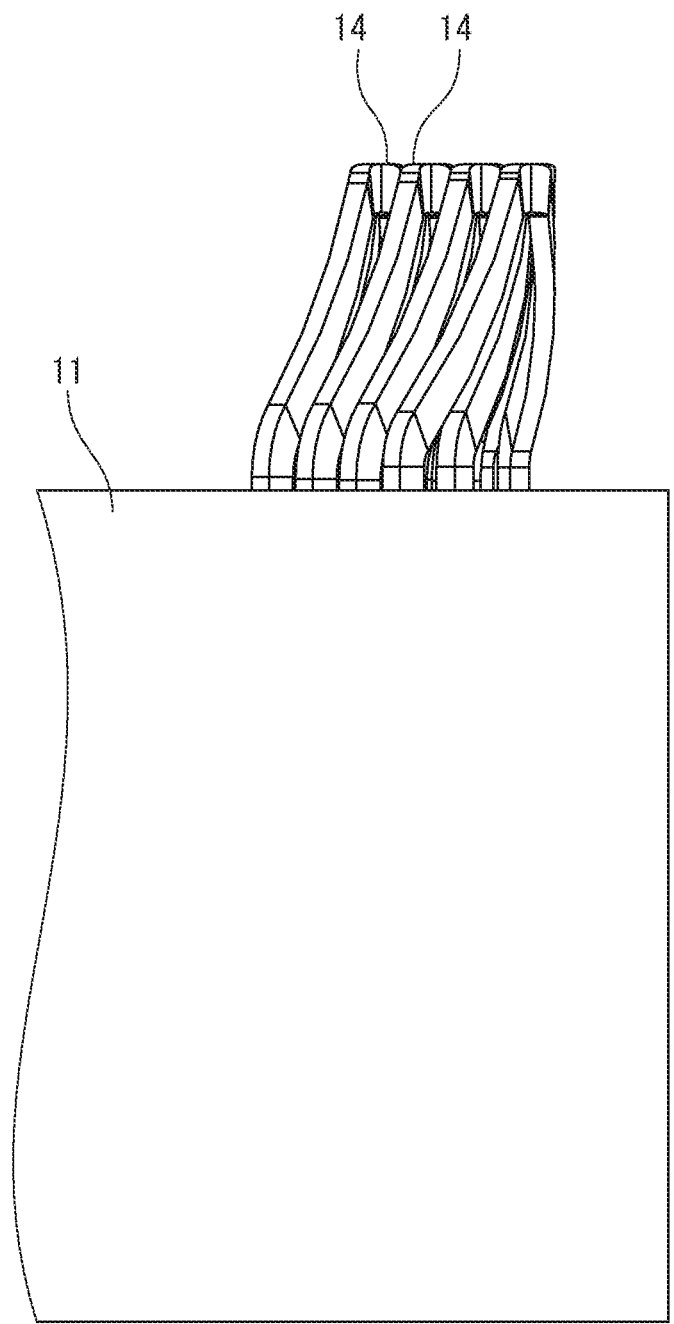
FIG. 18C is a right side view for describing the non-interference state of adjacent conductor segments in the case where the conductor segments illustrated in FIG. 17 are used.

Therefore, in the case illustrated in FIG. 17 and FIG. 18, the coil end height can be reduced to h1 without interference between adjacent conductor segments 14.

However, since the bend radius r1 inside the curve part 14h is smaller than the minimum R, the damage of the insulating coating (enamel coating) of the conductor segment 14 may be generated.

Next, the case where each of the conductor segments 14 is composed of the pair of linear parts 14a, the pair of inclined parts 14b, the curve part 14h that connects the apical ends of the pair of inclined parts 14b to each other, and the crank-shaped part 14*d* formed in the curve part 14*h*, and the conductor segments in each of which a bend radius r inside the curve part 14*h* of the minimum R are used will be described with reference to FIG. 19 and FIG. 20.

In this case, when the coil end height is made to be h1, the same as the case illustrated in FIG. 15 and FIG. 16, an inclination angle θ3 of the pair of inclined parts 14*b* with respect to the axis-direction end surface 11*a* of the stator core 11 becomes larger than the above-described inclination angle θ1.

Figure 20A:
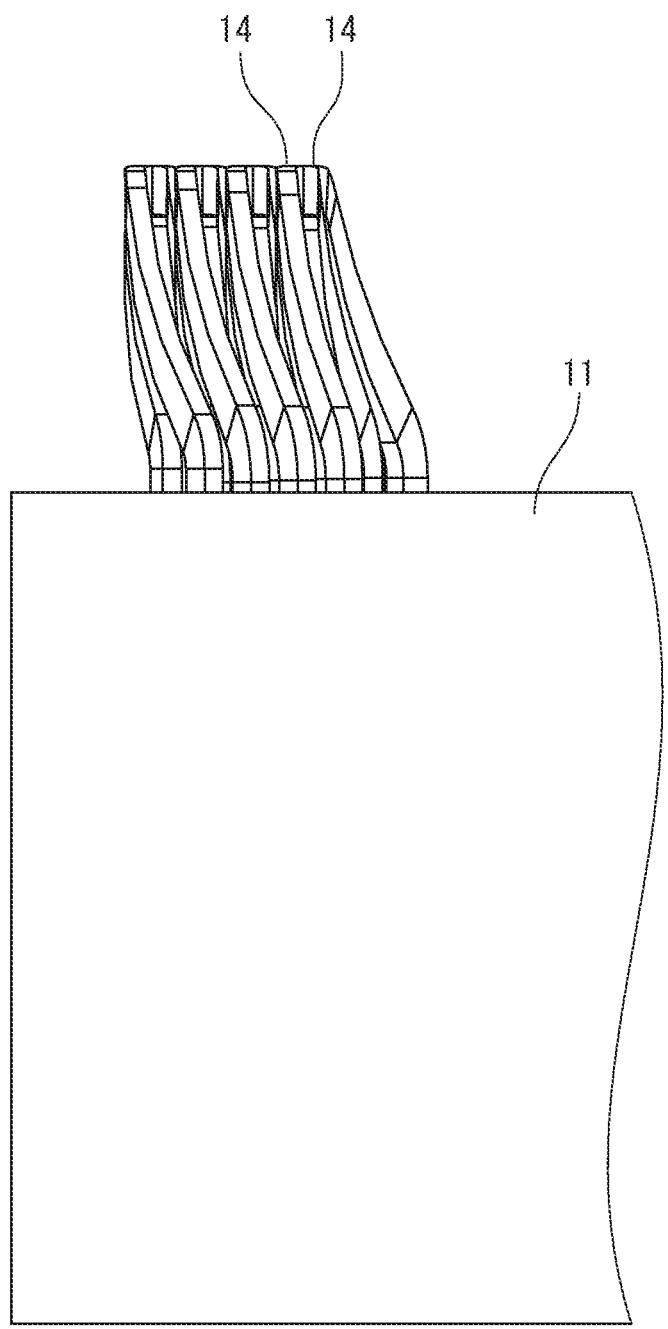
FIG. 20A is a left side view.
Figure 20B:
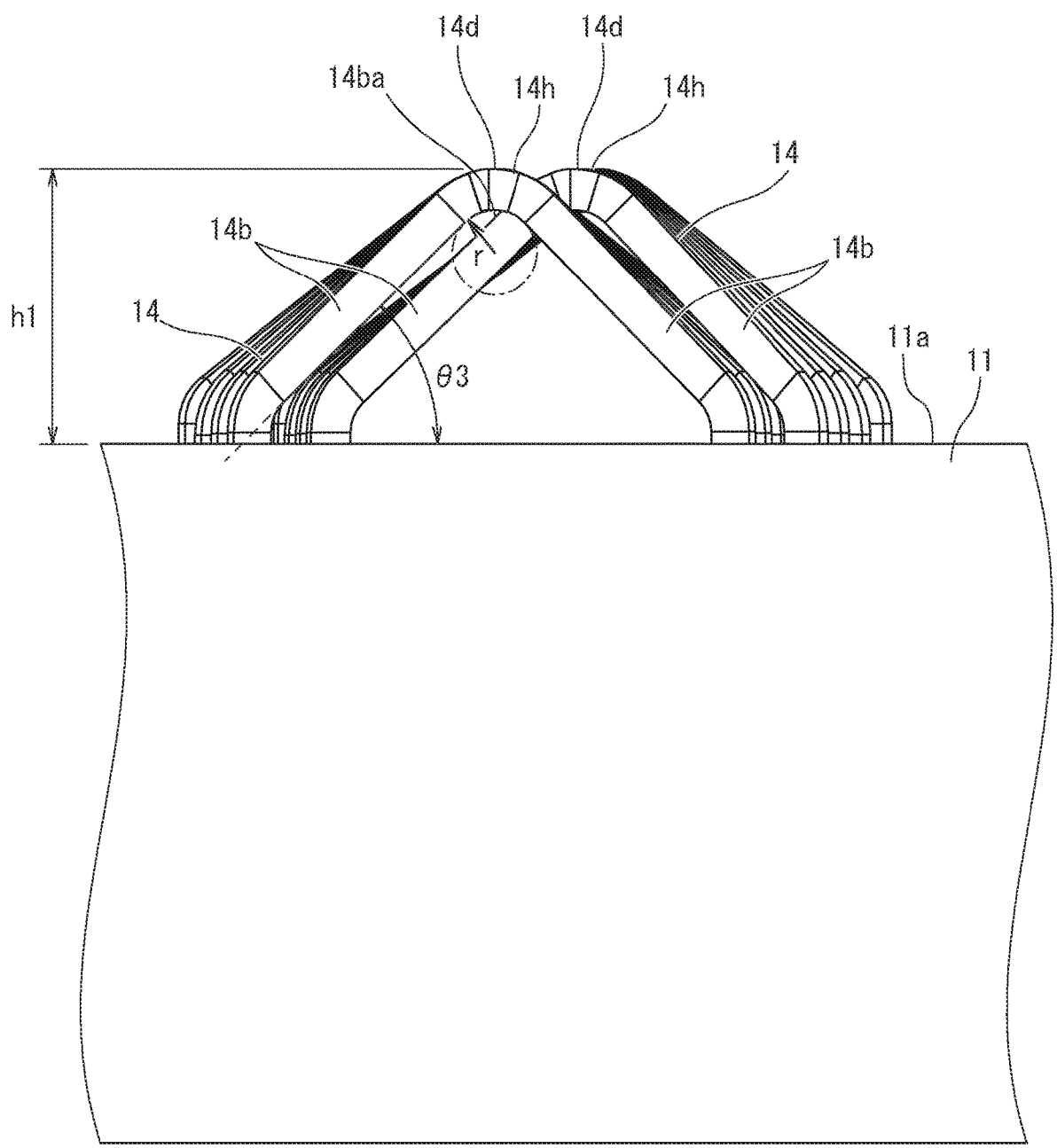
FIG. 20B is a front view.

Here, as illustrated in FIG. 20B, the crank-shaped part 14*d* of one of adjacent conductor segments 14 passes over the inclined part 14*b* of the other of the adjacent conductor segments 14. On this case, the upper corner edge 14*ba* of the inclined part 14*b* of the other of the adjacent conductor segments 14 interferes with the crank-shaped part 14*d* of the one of the adjacent conductor segments 14. This is because, since the bend radius r inside the curve part 14*h* of the other of the adjacent conductor segments 14 is the same as the minimum R and is larger than the bend radius r1 illustrated in FIG. 18B, the inclination starting point of the inclined part 14*b* of the other of the adjacent conductor segments 14 is close to the side of the crank-shaped part 14*d* of the one of the adjacent conductor segments 14, and the upper corner edge 14*ba* of the inclined part 14*b* of the other of the adjacent conductor segments 14 is high at the position of the crank-shaped part 14*d*.

Figure 19:
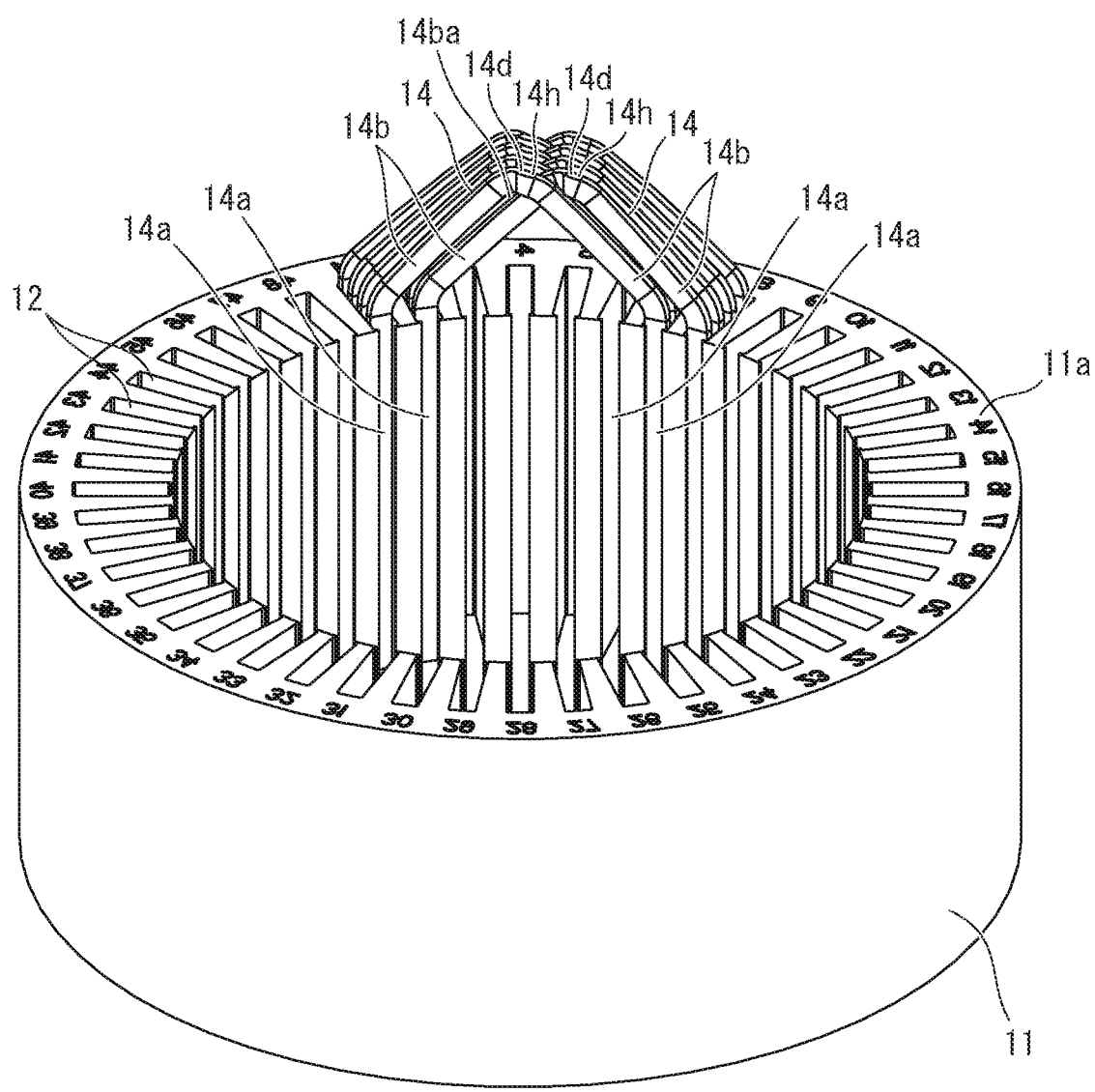
FIG. 19 is a perspective view for describing the interference state of adjacent conductor segments in the case where each of the conductor segments is composed of the pair of linear parts, the pair of inclined parts, the curve part that connects the apical ends of the pair of inclined parts to each other, and the crank-shaped part formed in the curve part, and the conductor segments in each of which a bend radius inside the curve part is the minimum R are used, however, in FIG. 19, only two adjacent conductor segments are illustrated for the purpose of illustration.
Figure 20C:
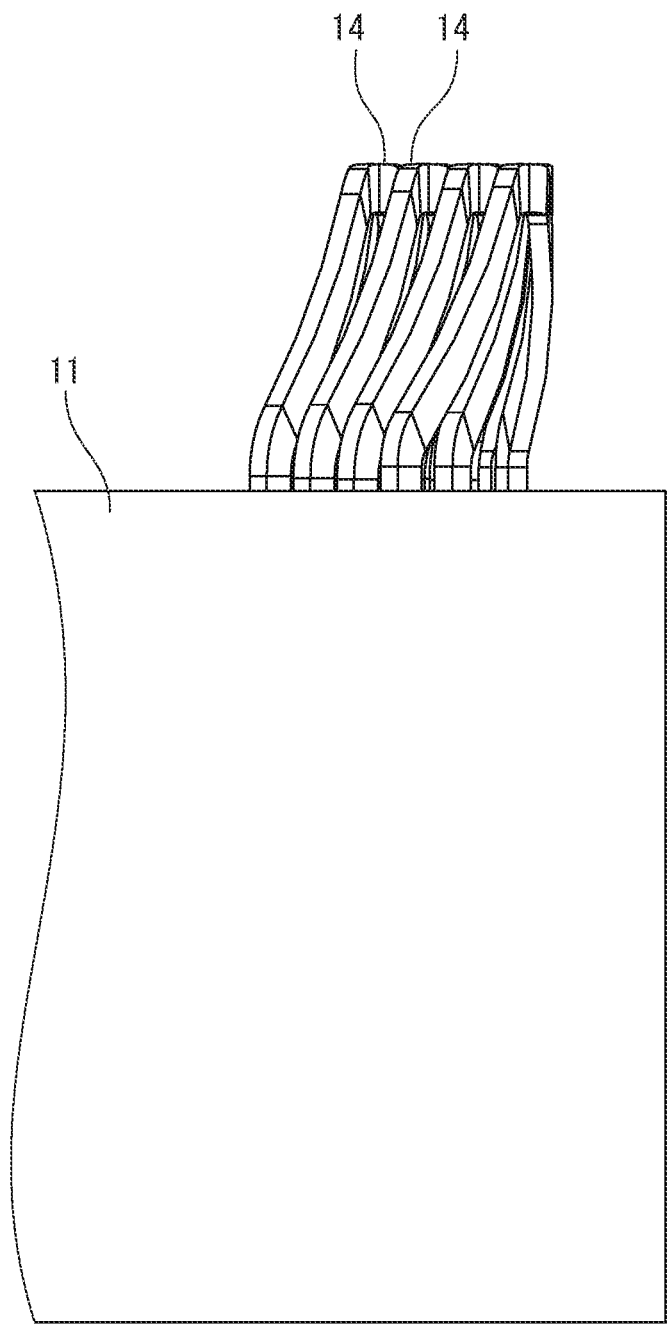
FIG. 20C is a right side view for describing the interference state of adjacent conductor segments in the case where the conductor segments illustrated in FIG. 19 are used.

Therefore, in the case illustrated in FIG. 19 and FIG. 20, when the coil end height is reduced to h1, adjacent conductor segments 14 interfere with each other.

However, since the bend radius r inside the curve part 14*h* is the same as the minimum R, the damage of the insulating coating (enamel coating) of the conductor segment 14 may not be generated.

Next, the case where each of the conductor segments 14 is composed of the pair of linear parts 14*a*, the pair of inclined parts 14*b*, the curve part 14*h* that connects the apical ends of the pair of inclined parts 14*b* to each other, and the crank-shaped part 14*d* formed in the curve part 14*h*, and the conductor segments in each of which a bend radius r inside the curve part 14*h* is the minimum R and a coil end height is made to be high, h2, are used will be described with reference to FIG. 21 and FIG. 22.

In this case, when the coil end height is made to be h2, higher than h1 in the case illustrated in FIG. 15 and FIG. 16, an inclination angle θ4 of the pair of inclined parts 14*b* with respect to the axis-direction end surface 11*a* of the stator core 11 becomes larger than the above-described inclination angle θ3.

Figure 22A:
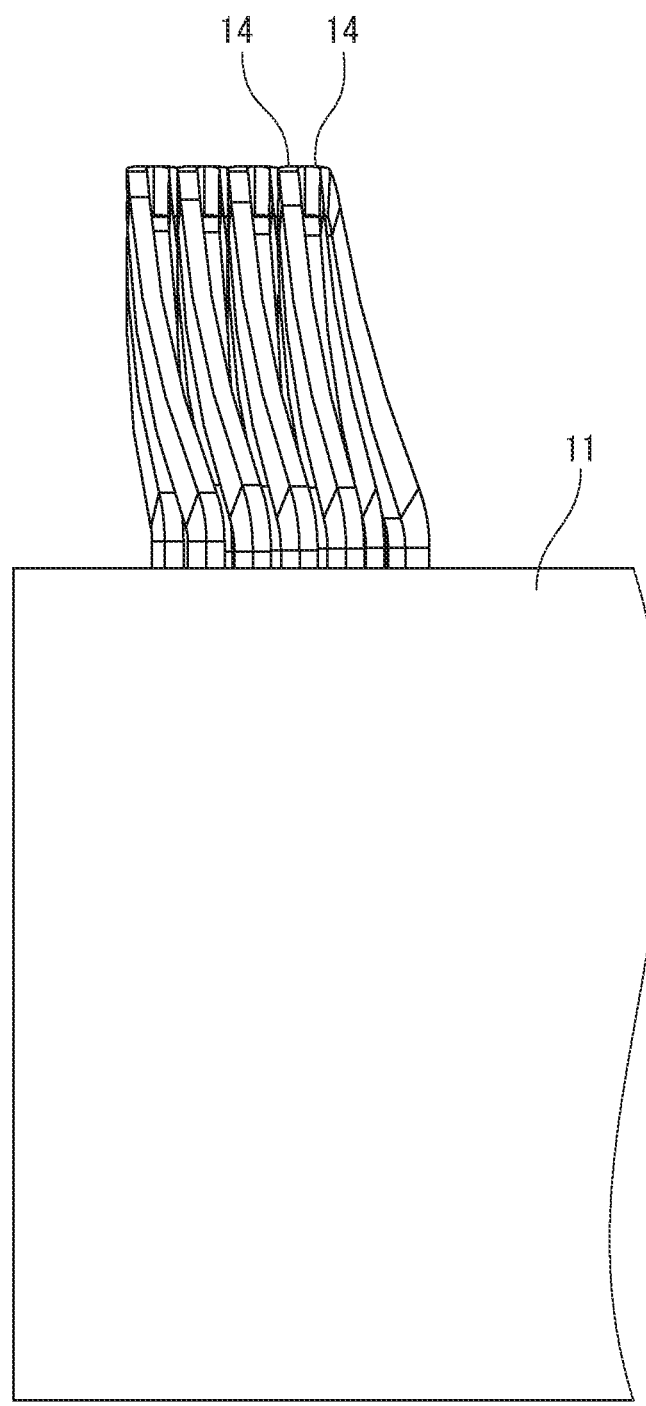
FIG. 22A is a left side view.
Figure 22B:
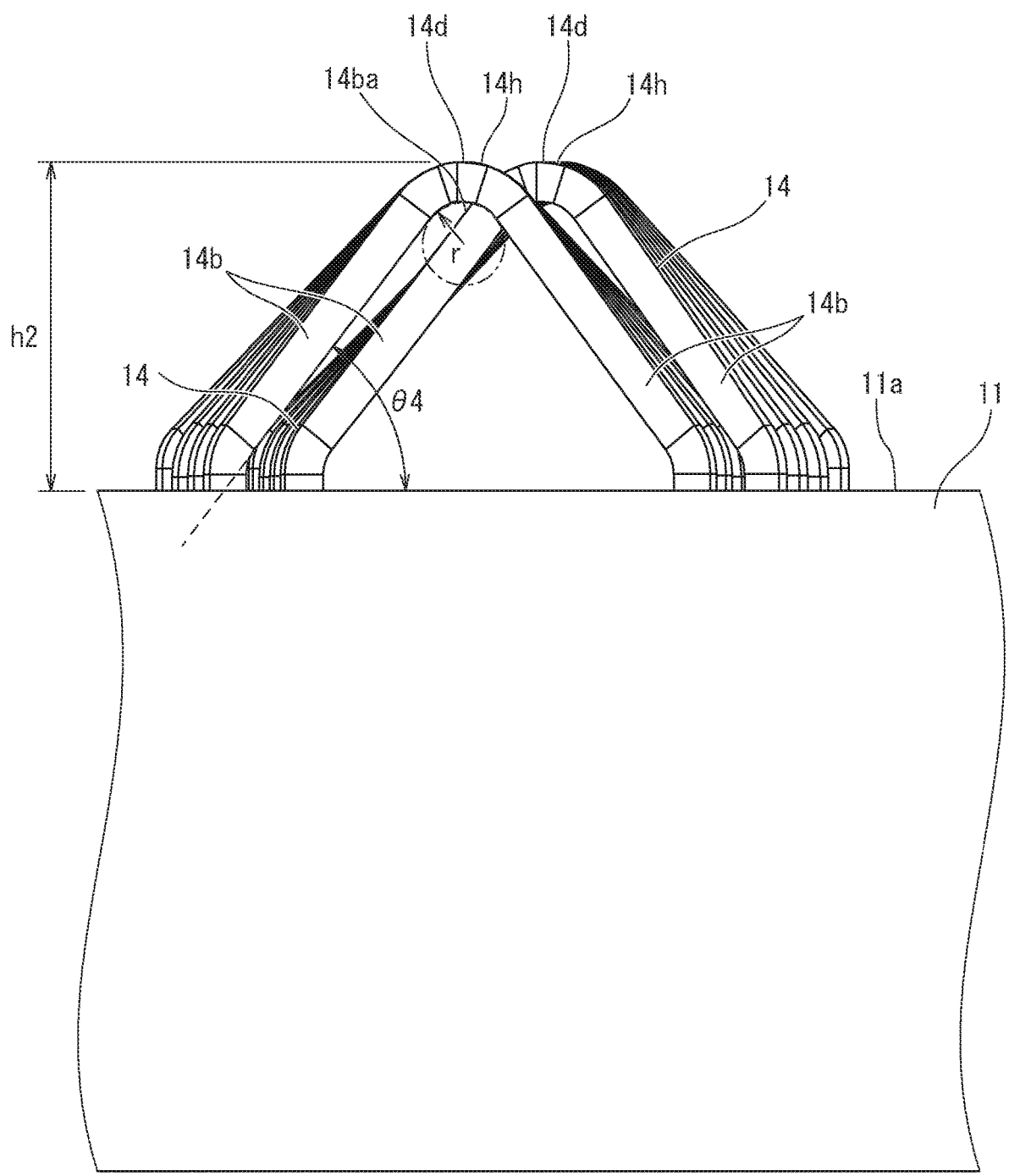
FIG. 22B is a front view.

Here, as illustrated in FIG. 22B, the crank-shaped part 14*d* of one of adjacent conductor segments 14 passes over the inclined part 14*b* of the other of the adjacent conductor segments 14. On this case, the upper corner edge 14*ba* of the inclined part 14*b* of the other of the adjacent conductor segments 14 is located under the crank-shaped part 14*d* of the one of the adjacent conductor segments 14 with a gap therebetween. This is because, since the bend radius r inside the curve part 14*h* of the other of the adjacent conductor segments 14 is the same as the minimum R and is larger than the bend radius r1 illustrated in FIG. 18B, the inclination starting point of the inclined part 14*b* of the other of the adjacent conductor segments 14 is close to the side of the crank-shaped part 14*d* of the one of the adjacent conductor segments 14, but, since the inclination angle θ4 of the inclined part 14*b* is larger than the inclination angle θ3, the upper corner edge 14*ba* of the inclined part 14*b* of the other of the adjacent conductor segments 14 is low at the position of the crank-shaped part 14*d*.

Figure 21:
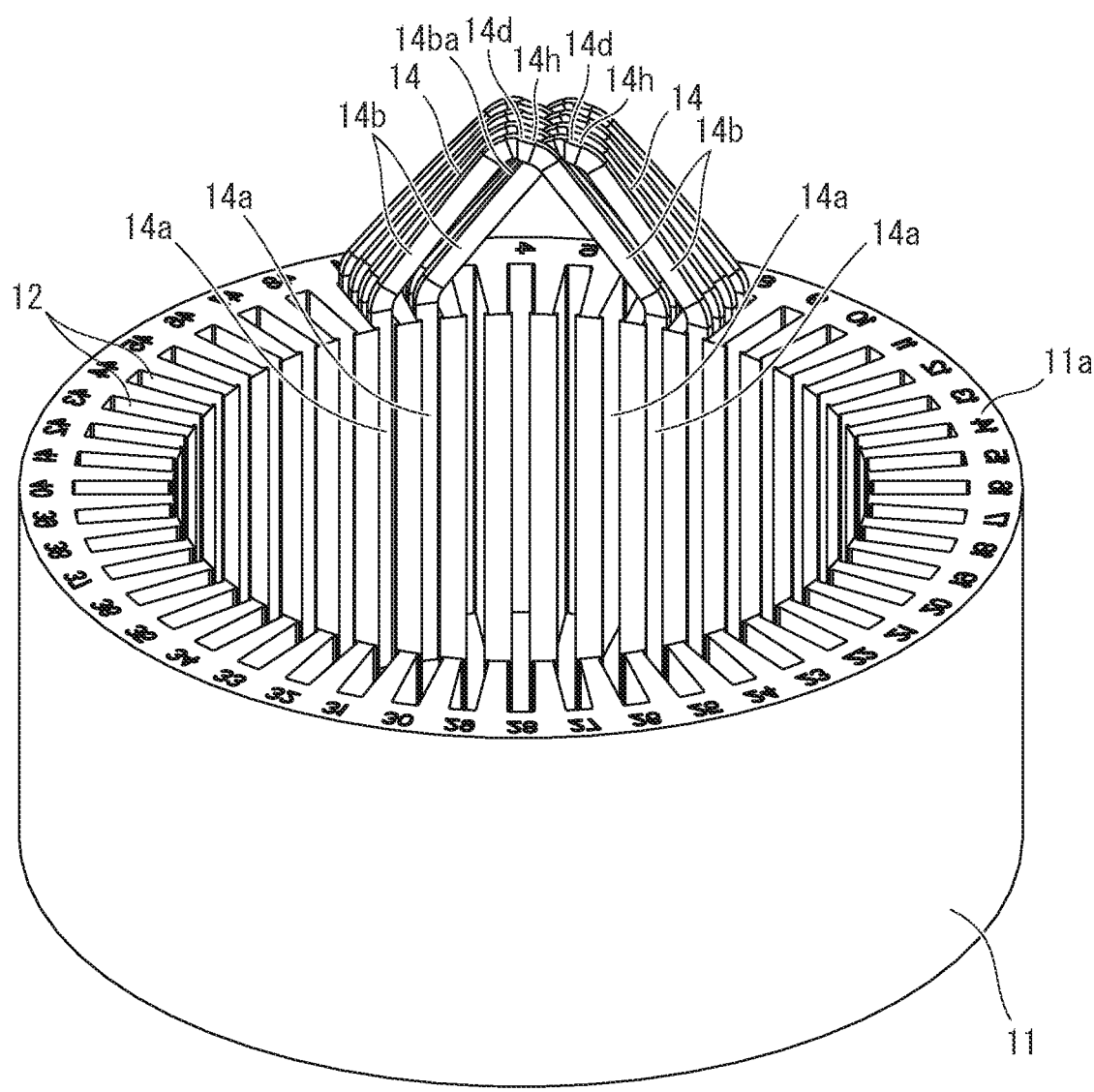
FIG. 21 is a perspective view for describing the non-interference state of adjacent conductor segments in the case where each of the conductor segments is composed of the pair of linear parts, the pair of inclined parts, the curve part that connects the apical ends of the pair of inclined parts to each other, and the crank-shaped part formed in the curve part, and the conductor segments in each of which a bend radius inside the curve part is the minimum R and a coil end height is made to be high are used, however, in FIG. 21, only two adjacent conductor segments are illustrated for the purpose of illustration.
Figure 22C:
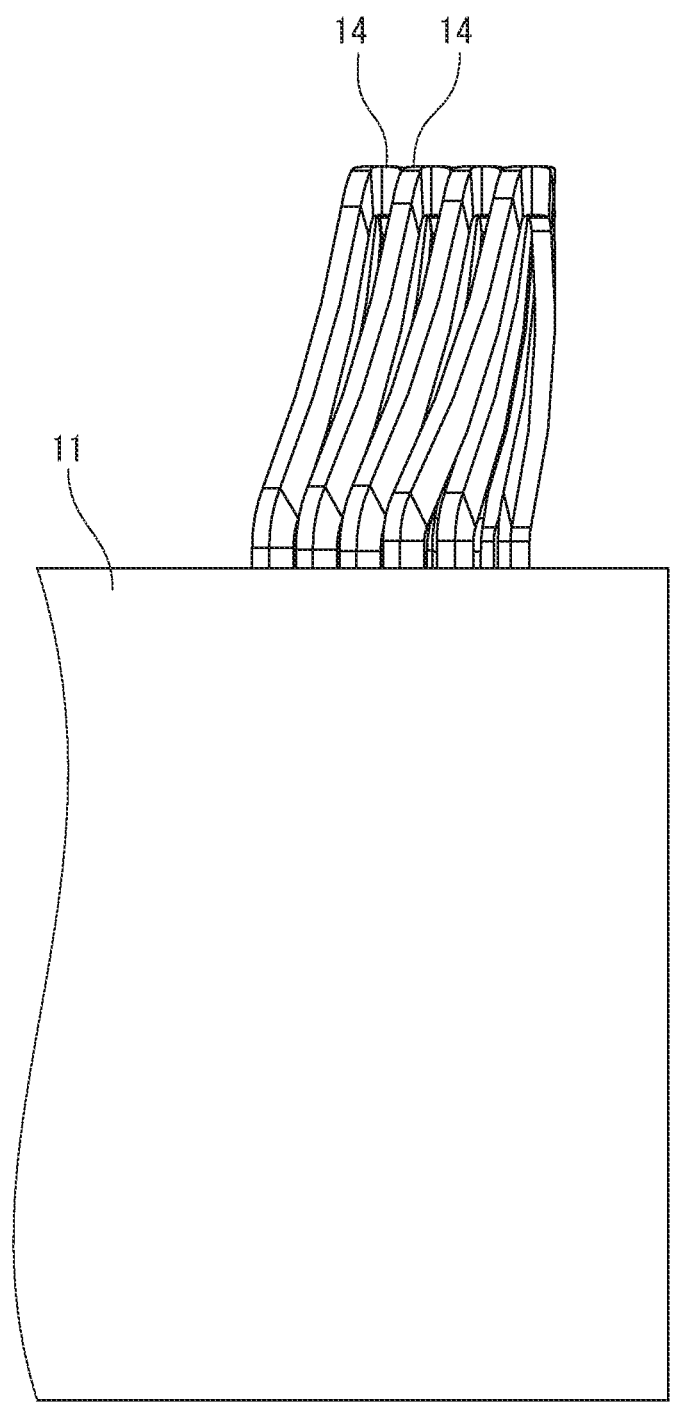
FIG. 22C is a right side view for describing the non-interference state of adjacent conductor segments in the case where the conductor segments illustrated in FIG. 21 are used.

Therefore, in the case illustrated in FIG. 21 and FIG. 22, interference between adjacent conductor segments 14 can be avoided, but the coil end height becomes high, h2.

However, since the bend radius r inside the curve part 14*h* is the same as the minimum R, the damage of the insulating coating (enamel coating) of the conductor segment 14 may not be generated.

In contrast, according to the stator 10 and the rotating electrical machine 1 according to the present embodiment, the coil end height can be reduced to h1 without interference between adjacent conductor segments 14 and without damage of the insulating coating, as described above.

Next, a modified example of the conductor segments 19 will be described with reference to FIG. 23. In FIG. 23, the same members as the members illustrated in FIG. 7 are denoted by the same reference numerals, and the description thereof is sometimes omitted.

The conductor segment 14 illustrated in FIG. 23 includes the pair of linear parts 14*a*, the pair of inclined parts 14*b*, the projecting curve part 14*c*, and the crank-shaped part 14*d*. The conductor segment 14 is formed by performing enamel coating (insulating coating) on the outer periphery of the conductor strand having a substantially rectangular cross section.

In the same manner as the pair of linear parts 14*a* of the conductor segment 14 illustrated in FIG. 7, the pair of linear parts 14*a* of the conductor segment 14 is inserted in a pair of slots 12 formed in the stator core 11 and different in the circumferential direction, and the end part 14*g* of each of the linear parts 14*a* is bent in the circumferential direction, and is bonded by welding to the end part 14*g* of another conductor segment 14 bent in the circumferential direction in the same manner.

In addition, in the same manner as the pair of inclined parts 14*b* of the conductor segment 14 illustrated in FIG. 7, the pair of inclined parts 14*b* is inclined and extends from the end parts on the opposite side of the respective end parts 14*g* of the pair of linear parts 14*a* in the axis direction toward the center part so as to project toward the outside in the axis direction from the axis-direction end surface of the stator core 11. An inclination angle θ5 of each of the inclined parts 14*b* with respect to the horizon (refer to FIG. 23B) is determined by a projection height of the conductor segment 14 from the axis-direction end surface 11*a* of the stator core 11. The projection height of the conductor segment 14 from the axis-direction end surface 11*a* of the stator core 11 is similar to the coil end height, and is similar to the projection height h1 of the conductor segment 14 illustrated in FIG. 7. It is to be noted that, although described below, line parts 14*i* exist in the projecting curve part 14*c* of the conductor segment 14 unlike the projecting curve part 14*c* of the conductor segment 14 illustrated in FIG. 7, and thus, the inclination angle θ5 is smaller than the inclination angle θ1.

In addition, the projecting curve part 14*c* is formed to connect the apical ends of the pair of inclined parts 14*b* to each other and to curve and project toward the outside in the axis direction. The projecting curve part 14*c* includes a pair of line parts 14*i* that linearly extends toward the outside in the axis direction from the apical ends of the respective pair of inclined parts 14*b* unlike the projecting curve part 14*c* of the conductor segment 14 illustrated in FIG. 7. In addition, the projecting curve part 14*c* includes a curve part 14*j* that connects apical ends of the pair of line parts 14*i* to each other and curves and projects toward the outside in the axis direction.

Figure 23A:
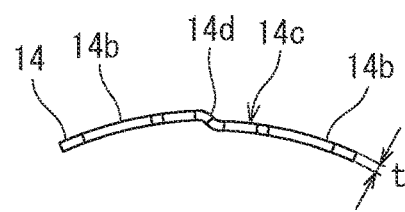
FIG. 23A is a plan view.
Figure 23C:
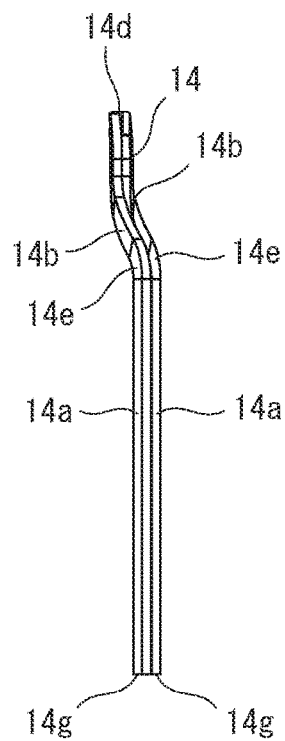
FIG. 23C is a left side view.

In addition, the crank-shaped part 14*d* is formed in the projecting curve part 14*c*, and displaces the conductor segment 14 by the sheet thickness t of the conductor segment 14 from one linear part 14*b* toward the other linear part 14*b*, as illustrated in FIG. 23A.

Figure 23B:
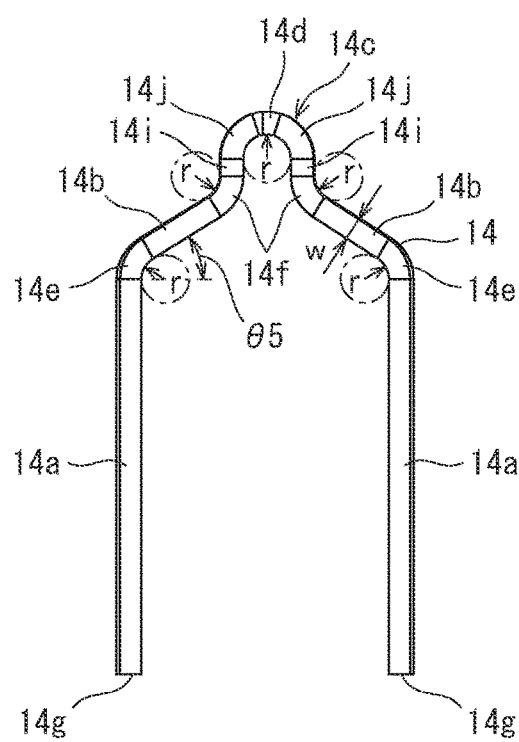
FIG. 23B is a front view.
Figure 23D:
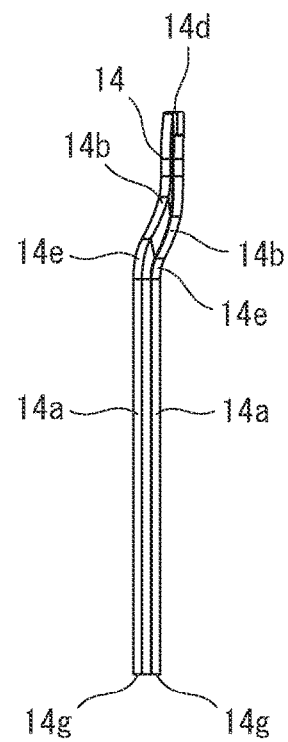
FIG. 23D is a right side view of a modified example of the conductor segment illustrated in FIG. 7.

In the conductor segment 14, as illustrated in FIG. 23B, the connection parts 14*e* between the respective pair of linear parts 14*a* and the respective pair of inclined parts 14*b*, the curve part 14*j*, and the connection parts 14*f* between the apical ends of the respective pair of inclined parts 14*b* and the respective pair of line parts 14*i* are all bent parts having the same bend radius r of the minimum R.

When manufacturing the conductor segment 14, first, a rod-shaped member having a radius of the minimum R is prepared.

Next, the inner surface of a part corresponding to one connection part 14*e* of a wire rod obtained by performing enamel coating (insulating coating) on the outer periphery of the conductor strand having a substantially rectangular cross section is bent using the above-described rod-shaped member such that the inclination angle of a part to be one inclined part 14*b* is θ5.

After that, the outer surface of a part corresponding to one connection part 14*f* is bent using the rod-shaped member such that a part to be the projecting curve part 14*c* projects, and the inner surface of a part to be the curve part 14*j* is bent using the rod-shaped member.

Then, the outer surface of a part corresponding to the other connection part 14*f* is bent using the rod-shaped member such that the other inclined part 14*b* is symmetrical to the one inclined part 14*b*.

Finally, the inner surface of a part corresponding to the other connection part 14*e* is bent using the rod-shaped member such that the other linear part 14*a* is parallel to one linear part 14*a*. Accordingly, the conductor segment 14 is completed.

As just described, in each of the conductor segments 14, the connection parts 14*e* between the respective pair of linear parts 14*a* and the respective pair of inclined parts 14*b*, the inside of the curve part 14*j*, and the connection parts 14*f* between the apical ends of the respective pair of inclined parts 14*b* and the projecting curve part 14*c* are all bent parts having the same bend radius r of the minimum R, and each of the conductor segments 14 can be manufactured using one rod-shaped member having a radius of the minimum R in bending, and thus, the conductor segments 14, and eventually, the stator 10 can be manufactured by a simple manufacturing method.

In addition, by using the conductor segment 14 illustrated in FIG. 23, the coil end height can be reduced to h1 without interference between adjacent conductor segments 14 and without damage of the insulating coating.

Although the embodiment of the present invention has been described above, the present invention is not limited thereto, and various changes and modifications can be made.

For example, the rotating electrical machine 1 using the stator 10 is described as a three-phase permanent magnet synchronous motor, but may be a three-phase induction motor.

In addition, the wire connection method of the U-phase stator windings 13, the V-phase stator windings 13, and the W-phase stator windings 13 is not limited to the described example.

In addition, in the stator 10 and the rotating electrical machine 1 using the conductor segment 14 illustrated in FIG. 7, as long as at least the connection parts 14*e* between the respective pair of linear parts 14*a* and the respective pair of inclined parts 14*b* and the curved part of the projecting curve part 14*c* are all bent parts having the same bend radius r of the minimum R, which has a size equal to or more than the sheet width w of the conductor strand, the connection parts 14*f* between the apical ends of the respective pair of inclined parts 14*b* and the projecting curve part 14*c* need not necessarily be bent parts having the bend radius r of the minimum. R. The connection parts 14*f* may be bent parts having a bend radius r larger than the minimum R.

Furthermore, in the stator 10 and the rotating electrical machine 1 using the conductor segment 14 illustrated in FIG. 23, as long as at least the connection parts 14*e* between the respective pair of linear parts 14*a* and the respective pair of inclined parts 14*b* and the curved part (curve part 14*j*) of the projecting curve part 14*c* are all bent parts having the same bend radius r of the minimum R, which has a size equal to or more than the sheet width w of the conductor strand, the connection parts 14*f* between the apical ends of the respective pair of inclined parts 14*b* and the respective pair of line parts 14*i* need not necessarily be bent parts having the bend radius r of the minimum R. The connection parts 14*f* may be bent parts having a bend radius larger than the minimum R.

REFERENCE SIGNS LIST 1 rotating electrical machine
10 stator
11 stator core
12 slot
13 stator winding
14 conductor segment
14*a* linear part
14*b* inclined part
14*c* projecting curve part
14*d* crank-shaped part
14*e* connection part
14*f* connection part
14*g* end part
14*i* line part
14*j* curve part

The invention claimed is:

1. A stator comprising:
a stator core having a plurality of slots in a circumferential direction; and
a plurality of stator windings placed in the plurality of slots, each of the plurality of stator windings is configured by bonding end parts of a plurality of conductor segments each of which is obtained by forming a conductor strand having a substantially rectangular cross section into a substantially U shape, wherein
each of the plurality of conductor segments includes a pair of linear parts to be inserted in a pair of slots formed in the stator core and different in the circumferential direction, a pair of inclined parts that is inclined and extends from end parts on an opposite side of the respective end parts of the pair of linear parts in an axis direction toward a center part so as to project toward the outside in the axis direction from an axis-direction end surface of the stator core, a projecting curve part that connects apical ends of the pair of inclined parts to each other and curves and projects toward the outside in the axis direction, and a crank-shaped part provided in the projecting curve part, and
at least connection parts between the respective pair of linear parts and the respective pair of inclined parts and a curved part of the projecting curve part are all bent parts having the same bend radius of minimum R, which has a size equal to or more than a sheet width of the conductor strand.

2. The stator according to claim 1, wherein connection parts between the apical ends of the respective pair of inclined parts and the projecting curve part are bent parts having the bend radius of the minimum R.

3. The stator according to claim 1, wherein the projecting curve part includes a pair of line parts that linearly extends toward the outside in the axis direction from the apical ends of the respective pair of inclined parts, and the curved part is a curve part that connects apical ends of the pair of line parts to each other and curves and projects toward the outside in the axis direction.

4. The stator according to claim 3, wherein connection parts between the apical ends of the respective pair of inclined parts and the respective pair of line parts are bent parts having the bend radius of the minimum R.

5. A rotating electrical machine comprising:

the stator according to claim 1; and a rotor provided on an inner peripheral side of the stator core of the stator.

6. A rotating electrical machine comprising:

the stator according to claim 2; and a rotor provided on an inner peripheral side of the stator core of the stator.

7. A rotating electrical machine comprising:

the stator according to claim 3; and a rotor provided on an inner peripheral side of the stator core of the stator.

8. A rotating electrical machine comprising:

the stator according to claim 4; and a rotor provided on an inner peripheral side of the stator core of the stator.

* * * * *